US008508193B2

(12) United States Patent
Keating et al.

(10) Patent No.: US 8,508,193 B2
(45) Date of Patent: Aug. 13, 2013

(54) ENVIRONMENTALLY-POWERED WIRELESS SENSOR MODULE

(75) Inventors: Joseph A. Keating, Broomfield, CO (US); Timothy N. Bradow, Littleton, CO (US); Raymond R. Johnson, Denver, CO (US); Prativadi B. Narayan, Broomfield, CO (US)

(73) Assignee: Infinite Power Solutions, Inc., Littleton, CO (US)

( * ) Notice: Subject to any disclaimer, the term of this patent is extended or adjusted under 35 U.S.C. 154(b) by 408 days.

(21) Appl. No.: 12/575,079

(22) Filed: Oct. 7, 2009

(65) Prior Publication Data

US 2010/0090655 A1    Apr. 15, 2010

Related U.S. Application Data

(60) Provisional application No. 61/103,746, filed on Oct. 8, 2008.

(51) Int. Cl.
*H02J 7/00* (2006.01)
*H01L 29/84* (2006.01)

(52) U.S. Cl.
USPC .......................................... 320/137; 257/254

(58) Field of Classification Search
USPC .......................................... 320/137; 257/254
See application file for complete search history.

(56) References Cited

U.S. PATENT DOCUMENTS

| 712,316 | A | 10/1902 | Loppe et al. |
| 2,970,180 | A | 1/1961 | Urry |
| 3,309,302 | A | 3/1967 | Heil |
| 3,616,403 | A | 10/1971 | Collins et al. |
| 3,790,432 | A | 2/1974 | Fletcher et al. |
| 3,797,091 | A | 3/1974 | Gavin |
| 3,850,604 | A | 11/1974 | Klein |
| 3,939,008 | A | 2/1976 | Longo et al. |
| 4,082,569 | A | 4/1978 | Evans, Jr. |
| 4,111,523 | A | 9/1978 | Kaminow et al. |
| 4,127,424 | A | 11/1978 | Ullery, Jr. |
| 4,226,924 | A | 10/1980 | Kimura et al. |
| 4,283,216 | A | 8/1981 | Brereton |

(Continued)

FOREIGN PATENT DOCUMENTS

| CN | 1415124 | 4/2003 |
| CN | 1532984 | 9/2004 |

(Continued)

OTHER PUBLICATIONS

Jones and Akridge, "A thin film solid state microbattery," Solid State Ionics 53-56 (1992), pp. 628-634.

(Continued)

*Primary Examiner* — M'Baye Diao
(74) *Attorney, Agent, or Firm* — Jeff E. Schwartz; Fox Rothschild LLP (57) ABSTRACT

A system that powers a wireless sensor mechanism from ambient sources without the need to replace a battery is disclosed. The present invention uses an energy harvesting mechanism built onto, for example, a substrate to recharge a rechargeable energy storage mechanism that is built on the same substrate. The energy storage mechanism provides power to a transmission/receiving mechanism and microprocessor that may also be arranged on said substrate. The energy-harvesting mechanism may be combined with a power management unit to enable efficient use and regulation of the harvested energy.

24 Claims, 2 Drawing Sheets

(56) References Cited

U.S. PATENT DOCUMENTS

| | | |
|---|---|---|
| 4,318,938 A | 3/1982 | Barnett et al. |
| 4,328,297 A | 5/1982 | Bilhorn |
| 4,395,713 A | 7/1983 | Nelson et al. |
| 4,437,966 A | 3/1984 | Hope et al. |
| 4,442,144 A | 4/1984 | Pipkin |
| 4,467,236 A | 8/1984 | Kolm et al. |
| 4,481,265 A | 11/1984 | Ezawa et al. |
| 4,518,661 A | 5/1985 | Rippere |
| 4,555,456 A | 11/1985 | Kanehori et al. |
| 4,572,873 A | 2/1986 | Kanehori et al. |
| 4,587,225 A | 5/1986 | Tsukuma et al. |
| 4,619,680 A | 10/1986 | Nourshargh et al. |
| 4,645,726 A | 2/1987 | Hiratani et al. |
| 4,664,993 A | 5/1987 | Sturgis et al. |
| 4,668,593 A | 5/1987 | Sammells |
| RE32,449 E | 6/1987 | Claussen |
| 4,672,586 A | 6/1987 | Shimohigashi et al. |
| 4,710,940 A | 12/1987 | Sipes, Jr. |
| 4,728,588 A | 3/1988 | Noding et al. |
| 4,740,431 A | 4/1988 | Little |
| 4,756,717 A | 7/1988 | Sturgis et al. |
| 4,785,459 A | 11/1988 | Baer |
| 4,826,743 A | 5/1989 | Nazri |
| 4,865,428 A | 9/1989 | Corrigan |
| 4,878,094 A | 10/1989 | Balkanski |
| 4,903,326 A | 2/1990 | Zakman et al. |
| 4,915,810 A | 4/1990 | Kestigian et al. |
| 4,964,877 A | 10/1990 | Keister et al. |
| 4,977,007 A | 12/1990 | Kondo et al. |
| 4,978,437 A | 12/1990 | Wirz |
| 5,006,737 A | 4/1991 | Fay |
| 5,019,467 A | 5/1991 | Fujiwara |
| 5,030,331 A | 7/1991 | Sato |
| 5,035,965 A | 7/1991 | Sangyoji et al. |
| 5,055,704 A | 10/1991 | Link et al. |
| 5,057,385 A | 10/1991 | Hope et al. |
| 5,085,904 A | 2/1992 | Deak et al. |
| 5,096,852 A | 3/1992 | Hobson |
| 5,100,821 A | 3/1992 | Fay |
| 5,107,538 A | 4/1992 | Benton et al. |
| 5,110,694 A | 5/1992 | Nagasubramanian et al. |
| 5,110,696 A | 5/1992 | Shokoohi et al. |
| 5,119,269 A | 6/1992 | Nakayama |
| 5,119,460 A | 6/1992 | Bruce et al. |
| 5,124,782 A | 6/1992 | Hundt et al. |
| 5,147,985 A | 9/1992 | DuBrucq |
| 5,153,710 A | 10/1992 | McCain |
| 5,169,408 A | 12/1992 | Biggerstaff et al. |
| 5,171,413 A | 12/1992 | Arntz et al. |
| 5,173,271 A | 12/1992 | Chen et al. |
| 5,174,876 A | 12/1992 | Buchal et al. |
| 5,180,645 A | 1/1993 | Moré |
| 5,187,564 A | 2/1993 | McCain |
| 5,196,041 A | 3/1993 | Tumminelli et al. |
| 5,196,374 A | 3/1993 | Hundt et al. |
| 5,200,029 A | 4/1993 | Bruce et al. |
| 5,202,201 A | 4/1993 | Meunier et al. |
| 5,206,925 A | 4/1993 | Nakazawa et al. |
| 5,208,121 A | 5/1993 | Yahnke et al. |
| 5,217,828 A | 6/1993 | Sangyoji et al. |
| 5,221,891 A | 6/1993 | Janda et al. |
| 5,225,288 A | 7/1993 | Beeson et al. |
| 5,227,264 A | 7/1993 | Duval et al. |
| 5,237,439 A | 8/1993 | Misono et al. |
| 5,252,194 A | 10/1993 | Demaray et al. |
| 5,262,254 A | 11/1993 | Koksbang et al. |
| 5,273,608 A | 12/1993 | Nath |
| 5,287,427 A | 2/1994 | Atkins et al. |
| 5,296,089 A | 3/1994 | Chen et al. |
| 5,300,461 A | 4/1994 | Ting |
| 5,302,474 A | 4/1994 | Shackle et al. |
| 5,303,319 A | 4/1994 | Ford et al. |
| 5,306,569 A | 4/1994 | Hiraki |
| 5,307,240 A | 4/1994 | McMahon |
| 5,309,302 A | 5/1994 | Vollmann |
| 5,314,765 A | 5/1994 | Bates |
| 5,326,652 A | 7/1994 | Lake |
| 5,326,653 A | 7/1994 | Chang |
| 5,338,624 A | 8/1994 | Gruenstern et al. |
| 5,338,625 A | 8/1994 | Bates et al. |
| 5,342,709 A | 8/1994 | Yahnke et al. |
| 5,355,089 A | 10/1994 | Treger et al. |
| 5,360,686 A | 11/1994 | Peled et al. |
| 5,362,579 A | 11/1994 | Rossoll et al. |
| 5,381,262 A | 1/1995 | Arima et al. |
| 5,387,482 A | 2/1995 | Anani |
| 5,401,595 A | 3/1995 | Kagawa et al. |
| 5,403,680 A | 4/1995 | Otagawa et al. |
| 5,411,537 A | 5/1995 | Munshi et al. |
| 5,411,592 A | 5/1995 | Ovshinsky et al. |
| 5,419,982 A | 5/1995 | Tura et al. |
| 5,427,669 A | 6/1995 | Drummond |
| 5,435,826 A | 7/1995 | Sakakibara et al. |
| 5,437,692 A | 8/1995 | Dasgupta et al. |
| 5,445,856 A | 8/1995 | Chaloner-Gill |
| 5,445,906 A | 8/1995 | Hobson et al. |
| 5,448,110 A | 9/1995 | Tuttle et al. |
| 5,449,576 A | 9/1995 | Anani |
| 5,455,126 A | 10/1995 | Bates et al. |
| 5,457,569 A | 10/1995 | Liou et al. |
| 5,458,995 A | 10/1995 | Behl et al. |
| 5,464,692 A | 11/1995 | Huber |
| 5,464,706 A | 11/1995 | Dasgupta et al. |
| 5,470,396 A | 11/1995 | Mongon et al. |
| 5,472,795 A | 12/1995 | Atita |
| 5,475,528 A | 12/1995 | LaBorde |
| 5,478,456 A | 12/1995 | Humpal et al. |
| 5,483,613 A | 1/1996 | Bruce et al. |
| 5,493,177 A | 2/1996 | Muller et al. |
| 5,498,489 A | 3/1996 | Dasgupta et al. |
| 5,499,207 A | 3/1996 | Miki et al. |
| 5,501,918 A | 3/1996 | Gruenstern et al. |
| 5,504,041 A | 4/1996 | Summerfelt |
| 5,512,147 A | 4/1996 | Bates et al. |
| 5,512,387 A | 4/1996 | Ovshinsky |
| 5,512,389 A | 4/1996 | Dasgupta et al. |
| 5,538,796 A | 7/1996 | Schaffer et al. |
| 5,540,742 A | 7/1996 | Sangyoji et al. |
| 5,547,780 A | 8/1996 | Kagawa et al. |
| 5,547,782 A | 8/1996 | Dasgupta et al. |
| 5,552,242 A | 9/1996 | Ovshinsky et al. |
| 5,555,127 A | 9/1996 | Abdelkader et al. |
| 5,561,004 A | 10/1996 | Bates et al. |
| 5,563,979 A | 10/1996 | Bruce et al. |
| 5,565,071 A | 10/1996 | Demaray et al. |
| 5,567,210 A | 10/1996 | Bates et al. |
| 5,569,520 A | 10/1996 | Bates |
| 5,582,935 A | 12/1996 | Dasgupta et al. |
| 5,591,520 A | 1/1997 | Migliorini et al. |
| 5,597,660 A | 1/1997 | Bates et al. |
| 5,597,661 A | 1/1997 | Takeuchi et al. |
| 5,599,355 A | 2/1997 | Nagasubramanian et al. |
| 5,601,952 A | 2/1997 | Dasgupta et al. |
| 5,603,816 A | 2/1997 | Demaray et al. |
| 5,607,560 A | 3/1997 | Hirabayashi et al. |
| 5,607,789 A | 3/1997 | Treger et al. |
| 5,612,152 A | 3/1997 | Bates |
| 5,612,153 A | 3/1997 | Moulton et al. |
| 5,613,995 A | 3/1997 | Bhandarkar et al. |
| 5,616,933 A | 4/1997 | Li |
| 5,618,382 A | 4/1997 | Mintz et al. |
| 5,625,202 A | 4/1997 | Chai |
| 5,637,418 A | 6/1997 | Brown et al. |
| 5,643,480 A | 7/1997 | Gustavsson et al. |
| 5,644,207 A | 7/1997 | Lew et al. |
| 5,645,626 A | 7/1997 | Edlund et al. |
| 5,645,960 A | 7/1997 | Scrosati et al. |
| 5,654,054 A | 8/1997 | Tropsha et al. |
| 5,654,984 A | 8/1997 | Hershbarger et al. |
| 5,658,652 A | 8/1997 | Sellergren |
| 5,660,700 A | 8/1997 | Shimizu et al. |
| 5,665,490 A | 9/1997 | Takeuchi et al. |
| 5,667,538 A | 9/1997 | Bailey |
| 5,677,784 A | 10/1997 | Harris |

| Patent No. | Date | Inventor |
|---|---|---|
| 5,679,980 A | 10/1997 | Summerfelt |
| 5,681,666 A | 10/1997 | Treger et al. |
| 5,686,360 A | 11/1997 | Harvey, III et al. |
| 5,689,522 A | 11/1997 | Beach |
| 5,693,956 A | 12/1997 | Shi et al. |
| 5,702,829 A | 12/1997 | Paidassi et al. |
| 5,705,293 A | 1/1998 | Hobson |
| 5,716,728 A | 2/1998 | Smesko |
| 5,718,813 A | 2/1998 | Drummond et al. |
| 5,719,976 A | 2/1998 | Henry et al. |
| 5,721,067 A | 2/1998 | Jacobs et al. |
| RE35,746 E | 3/1998 | Lake |
| 5,731,661 A | 3/1998 | So et al. |
| 5,738,731 A | 4/1998 | Shindo et al. |
| 5,742,094 A | 4/1998 | Ting |
| 5,755,938 A | 5/1998 | Fukui et al. |
| 5,755,940 A | 5/1998 | Shindo |
| 5,757,126 A | 5/1998 | Harvey, III et al. |
| 5,762,768 A | 6/1998 | Goy et al. |
| 5,763,058 A | 6/1998 | Isen et al. |
| 5,771,562 A | 6/1998 | Harvey, III et al. |
| 5,776,278 A | 7/1998 | Tuttle et al. |
| 5,779,839 A | 7/1998 | Tuttle et al. |
| 5,790,489 A | 8/1998 | O'Connor |
| 5,792,550 A | 8/1998 | Phillips et al. |
| 5,805,223 A | 9/1998 | Shikakura et al. |
| 5,811,177 A | 9/1998 | Shi et al. |
| 5,814,195 A | 9/1998 | Lehan et al. |
| 5,830,330 A | 11/1998 | Lantsman |
| 5,831,262 A | 11/1998 | Greywall et al. |
| 5,834,137 A | 11/1998 | Zhang et al. |
| 5,841,931 A | 11/1998 | Foresi et al. |
| 5,842,118 A | 11/1998 | Wood, Jr. |
| 5,845,990 A | 12/1998 | Hymer |
| 5,847,865 A | 12/1998 | Gopinath et al. |
| 5,849,163 A | 12/1998 | Ichikawa et al. |
| 5,851,896 A | 12/1998 | Summerfelt |
| 5,853,830 A | 12/1998 | McCaulley et al. |
| 5,855,744 A | 1/1999 | Halsey et al. |
| 5,856,705 A | 1/1999 | Ting |
| 5,864,182 A | 1/1999 | Matsuzaki |
| 5,865,860 A | 2/1999 | Delnick |
| 5,870,273 A | 2/1999 | Sogabe et al. |
| 5,874,184 A | 2/1999 | Takeuchi et al. |
| 5,882,721 A | 3/1999 | Delnick |
| 5,882,946 A | 3/1999 | Otani |
| 5,889,383 A | 3/1999 | Teich |
| 5,895,731 A | 4/1999 | Clingempeel |
| 5,897,522 A | 4/1999 | Nitzan |
| 5,900,057 A | 5/1999 | Buchal et al. |
| 5,909,346 A | 6/1999 | Malhotra et al. |
| 5,916,704 A | 6/1999 | Lewin et al. |
| 5,923,964 A | 7/1999 | Li |
| 5,930,046 A | 7/1999 | Solberg et al. |
| 5,930,584 A | 7/1999 | Sun et al. |
| 5,942,089 A | 8/1999 | Sproul et al. |
| 5,948,215 A | 9/1999 | Lantsmann |
| 5,948,464 A | 9/1999 | Delnick |
| 5,948,562 A | 9/1999 | Fulcher et al. |
| 5,952,778 A | 9/1999 | Haskal et al. |
| 5,955,217 A | 9/1999 | Lerberghe |
| 5,961,672 A | 10/1999 | Skotheim et al. |
| 5,961,682 A | 10/1999 | Lee et al. |
| 5,966,491 A | 10/1999 | DiGiovanni |
| 5,970,393 A | 10/1999 | Khorrami et al. |
| 5,973,913 A | 10/1999 | McEwen et al. |
| 5,977,582 A | 11/1999 | Flemming et al. |
| 5,982,144 A | 11/1999 | Johnson et al. |
| 5,985,484 A | 11/1999 | Young et al. |
| 5,985,485 A | 11/1999 | Ovshinsky et al. |
| 6,000,603 A | 12/1999 | Koskenmaki et al. |
| 6,001,224 A | 12/1999 | Drummond et al. |
| 6,004,660 A | 12/1999 | Topolski et al. |
| 6,007,945 A | 12/1999 | Jacobs et al. |
| 6,013,949 A | 1/2000 | Tuttle |
| 6,019,284 A | 2/2000 | Freeman et al. |
| 6,023,610 A | 2/2000 | Wood, Jr. |
| 6,024,844 A | 2/2000 | Drummond et al. |
| 6,025,094 A | 2/2000 | Visco et al. |
| 6,028,990 A | 2/2000 | Shahani et al. |
| 6,030,421 A | 2/2000 | Gauthier et al. |
| 6,033,768 A | 3/2000 | Muenz et al. |
| 6,042,965 A | 3/2000 | Nestler et al. |
| 6,045,626 A | 4/2000 | Yano et al. |
| 6,045,652 A | 4/2000 | Tuttle et al. |
| 6,045,942 A | 4/2000 | Miekka et al. |
| 6,046,081 A | 4/2000 | Kuo |
| 6,046,514 A | 4/2000 | Rouillard et al. |
| 6,048,372 A | 4/2000 | Mangahara et al. |
| 6,051,114 A | 4/2000 | Yao et al. |
| 6,051,296 A | 4/2000 | McCaulley et al. |
| 6,052,397 A | 4/2000 | Jeon et al. |
| 6,057,557 A | 5/2000 | Ichikawa |
| 6,058,233 A | 5/2000 | Dragone |
| 6,071,323 A | 6/2000 | Kawaguchi |
| 6,075,973 A | 6/2000 | Greeff et al. |
| 6,077,106 A | 6/2000 | Mish |
| 6,077,642 A | 6/2000 | Ogata et al. |
| 6,078,791 A | 6/2000 | Tuttle et al. |
| 6,080,508 A | 6/2000 | Dasgupta et al. |
| 6,080,643 A | 6/2000 | Noguchi et al. |
| 6,093,944 A | 7/2000 | VanDover |
| 6,094,292 A | 7/2000 | Goldner et al. |
| 6,096,569 A | 8/2000 | Matsuno et al. |
| 6,100,108 A | 8/2000 | Mizuno et al. |
| 6,106,933 A | 8/2000 | Nagai et al. |
| 6,110,531 A | 8/2000 | Paz De Araujo |
| 6,115,616 A | 9/2000 | Halperin et al. |
| 6,117,279 A | 9/2000 | Smolanoff et al. |
| 6,118,426 A | 9/2000 | Albert et al. |
| 6,120,890 A | 9/2000 | Chen et al. |
| 6,129,277 A | 10/2000 | Grant et al. |
| 6,133,670 A | 10/2000 | Rodgers et al. |
| 6,137,671 A | 10/2000 | Staffiere |
| 6,144,916 A | 11/2000 | Wood, Jr. et al. |
| 6,146,225 A | 11/2000 | Sheats et al. |
| 6,148,503 A | 11/2000 | Delnick et al. |
| 6,156,452 A | 12/2000 | Kozuki et al. |
| 6,157,765 A | 12/2000 | Bruce et al. |
| 6,159,635 A | 12/2000 | Dasgupta et al. |
| 6,160,373 A | 12/2000 | Dunn et al. |
| 6,162,709 A | 12/2000 | Raoux et al. |
| 6,165,566 A | 12/2000 | Tropsha |
| 6,168,884 B1 | 1/2001 | Neudecker et al. |
| 6,169,474 B1 | 1/2001 | Greeff et al. |
| 6,175,075 B1 | 1/2001 | Shiotsuka et al. |
| 6,176,986 B1 | 1/2001 | Watanabe et al. |
| 6,181,283 B1 | 1/2001 | Johnson et al. |
| 6,192,222 B1 | 2/2001 | Greeff et al. |
| 6,197,167 B1 | 3/2001 | Tanaka |
| 6,198,217 B1 | 3/2001 | Suzuki et al. |
| 6,204,111 B1 | 3/2001 | Uemoto et al. |
| 6,210,544 B1 | 4/2001 | Sasaki |
| 6,210,832 B1 | 4/2001 | Visco et al. |
| 6,214,061 B1 | 4/2001 | Visco et al. |
| 6,214,660 B1 | 4/2001 | Uemoto et al. |
| 6,218,049 B1 | 4/2001 | Bates et al. |
| 6,220,516 B1 | 4/2001 | Tuttle et al. |
| 6,223,317 B1 | 4/2001 | Pax et al. |
| 6,228,532 B1 | 5/2001 | Tsuji et al. |
| 6,229,987 B1 | 5/2001 | Greeff et al. |
| 6,232,242 B1 | 5/2001 | Hata et al. |
| 6,235,432 B1 | 5/2001 | Kono et al. |
| 6,236,793 B1 | 5/2001 | Lawrence et al. |
| 6,242,128 B1 | 6/2001 | Tura et al. |
| 6,242,129 B1 | 6/2001 | Johnson |
| 6,242,132 B1 | 6/2001 | Neudecker et al. |
| 6,248,291 B1 | 6/2001 | Nakagama et al. |
| 6,248,481 B1 | 6/2001 | Visco et al. |
| 6,248,640 B1 | 6/2001 | Nam |
| 6,249,222 B1 | 6/2001 | Gehlot |
| 6,252,564 B1 | 6/2001 | Albert et al. |
| 6,258,252 B1 | 7/2001 | Miyasaka et al. |
| 6,261,917 B1 | 7/2001 | Quek et al. |
| 6,264,709 B1 | 7/2001 | Yoon et al. |
| 6,265,652 B1 | 7/2001 | Kurata et al. |
| 6,268,695 B1 | 7/2001 | Affinito |
| 6,271,053 B1 | 8/2001 | Kondo |

| | | | |
|---|---|---|---|
| 6,271,793 B1 | 8/2001 | Brady et al. | |
| 6,271,801 B2 | 8/2001 | Tuttle et al. | |
| 6,280,585 B1 | 8/2001 | Obinata | |
| 6,280,875 B1 | 8/2001 | Kwak et al. | |
| 6,281,142 B1 | 8/2001 | Basceri | |
| 6,284,406 B1 | 9/2001 | Xing et al. | |
| 6,287,986 B1 | 9/2001 | Mihara | |
| 6,289,209 B1 | 9/2001 | Wood, Jr. | |
| 6,290,821 B1 | 9/2001 | McLeod | |
| 6,290,822 B1 | 9/2001 | Fleming et al. | |
| 6,291,098 B1 | 9/2001 | Shibuya et al. | |
| 6,294,722 B1 | 9/2001 | Kondo et al. | |
| 6,296,949 B1 | 10/2001 | Bergstresser et al. | |
| 6,296,967 B1 | 10/2001 | Jacobs et al. | |
| 6,296,971 B1 | 10/2001 | Hara | |
| 6,300,215 B1 | 10/2001 | Shin | |
| 6,302,939 B1 | 10/2001 | Rabin | |
| 6,306,265 B1 | 10/2001 | Fu et al. | |
| 6,316,563 B2 | 11/2001 | Naijo et al. | |
| 6,323,416 B1 | 11/2001 | Komori et al. | |
| 6,324,211 B1 | 11/2001 | Ovard et al. | |
| 6,325,294 B2 | 12/2001 | Tuttle et al. | |
| 6,329,213 B1 | 12/2001 | Tuttle et al. | |
| 6,339,236 B1 | 1/2002 | Tomii et al. | |
| 6,340,880 B1 | 1/2002 | Higashijima et al. | |
| 6,344,366 B1 | 2/2002 | Bates | |
| 6,344,419 B1 | 2/2002 | Forster et al. | |
| 6,344,795 B1 | 2/2002 | Gehlot | |
| 6,350,353 B2 | 2/2002 | Gopalraja et al. | |
| 6,351,630 B2 | 2/2002 | Wood, Jr. | |
| 6,356,230 B1 | 3/2002 | Greeff et al. | |
| 6,356,694 B1 | 3/2002 | Weber | |
| 6,356,764 B1 | 3/2002 | Ovard et al. | |
| 6,358,810 B1 | 3/2002 | Dornfest et al. | |
| 6,360,954 B1 | 3/2002 | Barnardo | |
| 6,361,662 B1 | 3/2002 | Chiba et al. | |
| 6,365,300 B1 | 4/2002 | Ota et al. | |
| 6,365,319 B1 | 4/2002 | Heath et al. | |
| 6,368,275 B1 | 4/2002 | Sliwa et al. | |
| 6,369,316 B1 | 4/2002 | Plessing et al. | |
| 6,372,383 B1 | 4/2002 | Lee et al. | |
| 6,372,386 B1 | 4/2002 | Cho et al. | |
| 6,373,224 B1 | 4/2002 | Goto et al. | |
| 6,375,780 B1 | 4/2002 | Tuttle et al. | |
| 6,376,027 B1 | 4/2002 | Lee et al. | |
| 6,379,835 B1 | 4/2002 | Kucherovsky et al. | |
| 6,379,842 B1 | 4/2002 | Mayer | |
| 6,379,846 B1 | 4/2002 | Terahara et al. | |
| 6,380,477 B1 | 4/2002 | Curtin | |
| 6,384,573 B1 | 5/2002 | Dunn | |
| 6,387,563 B1 | 5/2002 | Bates | |
| 6,391,166 B1 | 5/2002 | Wang | |
| 6,392,565 B1 | 5/2002 | Brown | |
| 6,394,598 B1 | 5/2002 | Kaiser | |
| 6,395,430 B1 | 5/2002 | Cho et al. | |
| 6,396,001 B1 | 5/2002 | Nakamura | |
| 6,398,824 B1 | 6/2002 | Johnson | |
| 6,399,241 B1 | 6/2002 | Hara et al. | |
| 6,402,039 B1 | 6/2002 | Freeman et al. | |
| 6,402,795 B1 | 6/2002 | Chu et al. | |
| 6,402,796 B1 | 6/2002 | Johnson | |
| 6,409,965 B1 | 6/2002 | Nagata et al. | |
| 6,413,284 B1 | 7/2002 | Chu et al. | |
| 6,413,285 B1 | 7/2002 | Chu et al. | |
| 6,413,382 B1 | 7/2002 | Wang et al. | |
| 6,413,645 B1 | 7/2002 | Graff et al. | |
| 6,413,676 B1 | 7/2002 | Munshi | |
| 6,414,626 B1 | 7/2002 | Greeff et al. | |
| 6,416,598 B1 | 7/2002 | Sircar | |
| 6,420,961 B1 | 7/2002 | Bates et al. | |
| 6,422,698 B2 | 7/2002 | Kaiser | |
| 6,423,106 B1 | 7/2002 | Bates | |
| 6,423,776 B1 | 7/2002 | Akkapeddi et al. | |
| 6,426,163 B1 | 7/2002 | Pasquier et al. | |
| 6,432,577 B1 | 8/2002 | Shul et al. | |
| 6,432,584 B1 | 8/2002 | Visco et al. | |
| 6,433,380 B2 | 8/2002 | Shin | |
| 6,433,465 B1 | 8/2002 | McKnight et al. | |
| 6,436,156 B1 | 8/2002 | Wandeloski et al. | |
| 6,437,231 B2 | 8/2002 | Kurata et al. | |
| 6,444,336 B1 | 9/2002 | Jia et al. | |
| 6,444,355 B1 | 9/2002 | Murai et al. | |
| 6,444,368 B1 | 9/2002 | Hikmet et al. | |
| 6,444,750 B1 | 9/2002 | Touhsaent | |
| 6,459,418 B1 | 10/2002 | Comiskey et al. | |
| 6,459,726 B1 | 10/2002 | Ovard et al. | |
| 6,466,771 B2 | 10/2002 | Wood, Jr. | |
| 6,475,668 B1 | 11/2002 | Hosokawa et al. | |
| 6,480,699 B1 | 11/2002 | Lovoi | |
| 6,481,623 B1 | 11/2002 | Grant et al. | |
| 6,488,822 B1 | 12/2002 | Moslehi | |
| 6,494,999 B1 | 12/2002 | Herrera et al. | |
| 6,495,283 B1 | 12/2002 | Yoon et al. | |
| 6,497,598 B2 | 12/2002 | Affinito | |
| 6,500,287 B1 | 12/2002 | Azens et al. | |
| 6,503,661 B1 | 1/2003 | Park et al. | |
| 6,503,831 B2 | 1/2003 | Speakman | |
| 6,506,289 B2 | 1/2003 | Demaray et al. | |
| 6,511,516 B1 | 1/2003 | Johnson et al. | |
| 6,511,615 B1 | 1/2003 | Dawes et al. | |
| 6,517,968 B2 | 2/2003 | Johnson et al. | |
| 6,522,067 B1 | 2/2003 | Graff et al. | |
| 6,524,466 B1 | 2/2003 | Bonaventura et al. | |
| 6,524,750 B1 | 2/2003 | Mansuetto | |
| 6,525,976 B1 | 2/2003 | Johnson | |
| 6,528,212 B1 | 3/2003 | Kusumoto et al. | |
| 6,529,827 B1 * | 3/2003 | Beason et al. | 701/454 |
| 6,533,907 B2 | 3/2003 | Demaray et al. | |
| 6,537,428 B1 | 3/2003 | Xiong et al. | |
| 6,538,211 B2 | 3/2003 | St. Lawrence et al. | |
| 6,541,147 B1 | 4/2003 | McLean et al. | |
| 6,548,912 B1 | 4/2003 | Graff et al. | |
| 6,551,745 B2 | 4/2003 | Moutsios et al. | |
| 6,558,836 B1 | 5/2003 | Whitacre et al. | |
| 6,562,513 B1 | 5/2003 | Takeuchi et al. | |
| 6,563,998 B1 | 5/2003 | Farah et al. | |
| 6,569,564 B1 | 5/2003 | Lane | |
| 6,569,570 B2 | 5/2003 | Sonobe et al. | |
| 6,570,325 B2 | 5/2003 | Graff et al. | |
| 6,572,173 B2 | 6/2003 | Muller | |
| 6,573,652 B1 | 6/2003 | Graff et al. | |
| 6,576,546 B2 | 6/2003 | Gilbert et al. | |
| 6,579,728 B2 | 6/2003 | Grant et al. | |
| 6,582,480 B2 | 6/2003 | Pasquier et al. | |
| 6,582,481 B1 | 6/2003 | Erbil | |
| 6,582,852 B1 | 6/2003 | Gao et al. | |
| 6,589,299 B2 | 7/2003 | Missling et al. | |
| 6,593,150 B2 | 7/2003 | Ramberg et al. | |
| 6,599,662 B1 | 7/2003 | Chiang et al. | |
| 6,600,905 B2 | 7/2003 | Greeff et al. | |
| 6,602,338 B2 | 8/2003 | Chen et al. | |
| 6,603,139 B1 | 8/2003 | Tessler et al. | |
| 6,603,391 B1 | 8/2003 | Greeff et al. | |
| 6,605,228 B1 | 8/2003 | Kawaguchi et al. | |
| 6,608,464 B1 | 8/2003 | Lew et al. | |
| 6,608,470 B1 | 8/2003 | Oglesbee et al. | |
| 6,610,440 B1 | 8/2003 | LaFollette et al. | |
| 6,615,614 B1 | 9/2003 | Makikawa et al. | |
| 6,616,035 B2 | 9/2003 | Ehrensvard et al. | |
| 6,618,829 B2 | 9/2003 | Pax et al. | |
| 6,620,545 B2 | 9/2003 | Goenka et al. | |
| 6,622,049 B2 | 9/2003 | Penner et al. | |
| 6,632,563 B1 | 10/2003 | Krasnov et al. | |
| 6,637,906 B2 | 10/2003 | Knoerzer et al. | |
| 6,637,916 B2 | 10/2003 | Mullner | |
| 6,639,578 B1 | 10/2003 | Comiskey et al. | |
| 6,642,895 B2 | 11/2003 | Zurcher et al. | |
| 6,645,675 B1 | 11/2003 | Munshi | |
| 6,650,000 B2 | 11/2003 | Ballantine et al. | |
| 6,650,942 B2 | 11/2003 | Howard et al. | |
| 6,662,430 B2 | 12/2003 | Brady et al. | |
| 6,664,006 B1 | 12/2003 | Munshi | |
| 6,673,484 B2 | 1/2004 | Matsuura | |
| 6,673,716 B1 | 1/2004 | D'Couto et al. | |
| 6,674,159 B1 | 1/2004 | Peterson et al. | |
| 6,677,070 B2 | 1/2004 | Kearl | |
| 6,683,244 B2 | 1/2004 | Fujimori et al. | |
| 6,683,749 B2 | 1/2004 | Daby et al. | |

| Patent | Date | Inventor |
|---|---|---|
| 6,686,096 B1 | 2/2004 | Chung |
| 6,693,840 B2 | 2/2004 | Shimada et al. |
| 6,700,491 B2 | 3/2004 | Shafer |
| 6,706,449 B2 | 3/2004 | Mikhaylik et al. |
| 6,709,778 B2 | 3/2004 | Johnson |
| 6,713,216 B2 | 3/2004 | Kugai et al. |
| 6,713,389 B2 | 3/2004 | Speakman |
| 6,713,987 B2 | 3/2004 | Krasnov et al. |
| 6,723,140 B2 | 4/2004 | Chu et al. |
| 6,730,423 B2 | 5/2004 | Einhart et al. |
| 6,733,924 B1 | 5/2004 | Skotheim et al. |
| 6,737,197 B2 | 5/2004 | Chu et al. |
| 6,737,789 B2 | 5/2004 | Radziemski et al. |
| 6,741,178 B1 | 5/2004 | Tuttle |
| 6,750,156 B2 | 6/2004 | Le et al. |
| 6,752,842 B2 | 6/2004 | Luski et al. |
| 6,753,108 B1 | 6/2004 | Hampden-Smith et al. |
| 6,753,114 B2 | 6/2004 | Jacobs et al. |
| 6,760,520 B1 | 7/2004 | Medin et al. |
| 6,764,525 B1 | 7/2004 | Whitacre et al. |
| 6,768,246 B2 | 7/2004 | Pelrine et al. |
| 6,768,855 B1 | 7/2004 | Bakke et al. |
| 6,770,176 B2 | 8/2004 | Benson et al. |
| 6,773,848 B1 | 8/2004 | Nortoft et al. |
| 6,780,208 B2 | 8/2004 | Hopkins et al. |
| 6,797,428 B1 | 9/2004 | Skotheim et al. |
| 6,797,429 B1 | 9/2004 | Komatsu |
| 6,805,998 B2 | 10/2004 | Jensen et al. |
| 6,805,999 B2 | 10/2004 | Lee et al. |
| 6,818,356 B1 | 11/2004 | Bates |
| 6,822,157 B2 | 11/2004 | Fujioka |
| 6,824,922 B2 | 11/2004 | Park et al. |
| 6,827,826 B2 | 12/2004 | Demaray et al. |
| 6,828,063 B2 | 12/2004 | Park et al. |
| 6,828,065 B2 | 12/2004 | Munshi |
| 6,830,846 B2 | 12/2004 | Kramlich et al. |
| 6,835,493 B2 | 12/2004 | Zhang et al. |
| 6,838,209 B2 | 1/2005 | Langan et al. |
| 6,846,765 B2 | 1/2005 | Imamura et al. |
| 6,852,139 B2 | 2/2005 | Zhang et al. |
| 6,855,441 B1 | 2/2005 | Levanon |
| 6,861,821 B2 | 3/2005 | Masumoto et al. |
| 6,863,699 B1 | 3/2005 | Krasnov et al. |
| 6,865,080 B2 * | 3/2005 | Radosevich et al. .......... 361/699 |
| 6,866,901 B2 | 3/2005 | Burrows et al. |
| 6,866,963 B2 | 3/2005 | Seung et al. |
| 6,869,722 B2 | 3/2005 | Kearl |
| 6,884,327 B2 | 4/2005 | Pan et al. |
| 6,886,240 B2 | 5/2005 | Zhang et al. |
| 6,890,385 B2 | 5/2005 | Tsuchiya et al. |
| 6,896,992 B2 | 5/2005 | Kearl |
| 6,899,975 B2 | 5/2005 | Watanabe et al. |
| 6,902,660 B2 | 6/2005 | Lee et al. |
| 6,905,578 B1 | 6/2005 | Moslehi et al. |
| 6,906,436 B2 | 6/2005 | Jenson et al. |
| 6,911,667 B2 | 6/2005 | Pichler et al. |
| 6,916,679 B2 | 7/2005 | Snyder et al. |
| 6,921,464 B2 | 7/2005 | Krasnov et al. |
| 6,923,702 B2 | 8/2005 | Graff et al. |
| 6,924,164 B2 | 8/2005 | Jensen |
| 6,929,879 B2 | 8/2005 | Yamazaki |
| 6,936,377 B2 | 8/2005 | Wensley et al. |
| 6,936,381 B2 | 8/2005 | Skotheim et al. |
| 6,936,407 B2 | 8/2005 | Pichler |
| 6,949,389 B2 | 9/2005 | Pichler et al. |
| 6,955,986 B2 | 10/2005 | Li |
| 6,962,613 B2 | 11/2005 | Jenson |
| 6,962,671 B2 | 11/2005 | Martin et al. |
| 6,964,829 B2 | 11/2005 | Utsugi et al. |
| 6,982,132 B1 | 1/2006 | Goldner et al. |
| 6,986,965 B2 | 1/2006 | Jenson et al. |
| 6,994,933 B1 | 2/2006 | Bates |
| 7,022,431 B2 | 4/2006 | Shchori et al. |
| 7,033,406 B2 | 4/2006 | Weir et al. |
| 7,045,246 B2 | 5/2006 | Simburger et al. |
| 7,045,372 B2 | 5/2006 | Ballantine et al. |
| 7,056,620 B2 | 6/2006 | Krasnov et al. |
| 7,073,723 B2 | 7/2006 | Fürst et al. |
| 7,095,372 B2 | 8/2006 | Soler Castany et al. |
| 7,129,166 B2 | 10/2006 | Speakman |
| 7,131,189 B2 | 11/2006 | Jenson |
| 7,144,654 B2 | 12/2006 | LaFollette et al. |
| 7,144,655 B2 | 12/2006 | Jenson et al. |
| 7,157,187 B2 | 1/2007 | Jenson |
| 7,158,031 B2 | 1/2007 | Tuttle |
| 7,162,392 B2 | 1/2007 | Vock et al. |
| 7,183,693 B2 | 2/2007 | Brantner et al. |
| 7,186,479 B2 | 3/2007 | Krasnov et al. |
| 7,194,801 B2 | 3/2007 | Jenson et al. |
| 7,198,832 B2 | 4/2007 | Burrows et al. |
| 7,202,825 B2 | 4/2007 | Leizerovich et al. |
| 7,220,517 B2 | 5/2007 | Park et al. |
| 7,230,321 B2 | 6/2007 | McCain |
| 7,247,408 B2 | 7/2007 | Skotheim et al. |
| 7,253,494 B2 | 8/2007 | Mino et al. |
| 7,265,674 B2 | 9/2007 | Tuttle |
| 7,267,904 B2 | 9/2007 | Komatsu et al. |
| 7,267,906 B2 | 9/2007 | Mizuta et al. |
| 7,273,682 B2 | 9/2007 | Park et al. |
| 7,274,118 B2 | 9/2007 | Jenson et al. |
| 7,288,340 B2 | 10/2007 | Iwamoto |
| 7,316,867 B2 | 1/2008 | Park et al. |
| 7,323,634 B2 | 1/2008 | Speakman |
| 7,332,363 B2 | 2/2008 | Edwards |
| 7,335,441 B2 | 2/2008 | Luski et al. |
| RE40,137 E | 3/2008 | Tuttle et al. |
| 7,345,647 B1 | 3/2008 | Rodenbeck |
| 7,348,099 B2 | 3/2008 | Mukai et al. |
| 7,389,580 B2 | 6/2008 | Jenson et al. |
| 7,400,253 B2 | 7/2008 | Cohen |
| 7,410,730 B2 | 8/2008 | Bates |
| RE40,531 E | 10/2008 | Graff et al. |
| 7,466,274 B2 | 12/2008 | Lin et al. |
| 7,468,221 B2 | 12/2008 | LaFollette et al. |
| 7,494,742 B2 | 2/2009 | Tarnowski et al. |
| 7,670,724 B1 | 3/2010 | Chan et al. |
| 7,848,715 B2 | 12/2010 | Boos |
| 7,858,223 B2 | 12/2010 | Visco et al. |
| 8,010,048 B2 | 8/2011 | Brommer et al. |
| 8,034,006 B2 * | 10/2011 | Celik-Butler et al. .......... 601/41 |
| 8,056,814 B2 | 11/2011 | Martin et al. |
| 2001/0005561 A1 | 6/2001 | Yamada et al. |
| 2001/0027159 A1 | 10/2001 | Kaneyoshi |
| 2001/0031122 A1 | 10/2001 | Lackritz et al. |
| 2001/0032666 A1 | 10/2001 | Jenson et al. |
| 2001/0033952 A1 | 10/2001 | Jenson et al. |
| 2001/0034106 A1 | 10/2001 | Moise et al. |
| 2001/0041294 A1 | 11/2001 | Chu et al. |
| 2001/0041460 A1 | 11/2001 | Wiggins |
| 2001/0052752 A1 | 12/2001 | Ghosh et al. |
| 2001/0054437 A1 | 12/2001 | Komori et al. |
| 2001/0055719 A1 | 12/2001 | Akashi et al. |
| 2002/0000034 A1 | 1/2002 | Jenson |
| 2002/0001746 A1 | 1/2002 | Jenson |
| 2002/0001747 A1 | 1/2002 | Jenson |
| 2002/0004167 A1 | 1/2002 | Jenson et al. |
| 2002/0009630 A1 | 1/2002 | Gao et al. |
| 2002/0019296 A1 | 2/2002 | Freeman et al. |
| 2002/0028377 A1 | 3/2002 | Gross |
| 2002/0033330 A1 | 3/2002 | Demaray et al. |
| 2002/0037756 A1 | 3/2002 | Jacobs et al. |
| 2002/0066539 A1 | 6/2002 | Muller |
| 2002/0067615 A1 | 6/2002 | Muller |
| 2002/0071989 A1 | 6/2002 | Verma et al. |
| 2002/0076133 A1 | 6/2002 | Li et al. |
| 2002/0091929 A1 | 7/2002 | Ehrensvard |
| 2002/0093029 A1 | 7/2002 | Ballantine et al. |
| 2002/0106297 A1 | 8/2002 | Ueno et al. |
| 2002/0110733 A1 | 8/2002 | Johnson |
| 2002/0115252 A1 | 8/2002 | Haukka et al. |
| 2002/0134671 A1 | 9/2002 | Demaray et al. |
| 2002/0139662 A1 | 10/2002 | Lee |
| 2002/0140103 A1 | 10/2002 | Kloster et al. |
| 2002/0159245 A1 | 10/2002 | Murasko et al. |
| 2002/0161404 A1 | 10/2002 | Schmidt |
| 2002/0164441 A1 | 11/2002 | Amine et al. |
| 2002/0170821 A1 | 11/2002 | Sandlin et al. |
| 2002/0170960 A1 | 11/2002 | Ehrensvard et al. |

| | | | | | |
|---|---|---|---|---|---|
| 2003/0019326 A1 | 1/2003 | Han et al. | 2005/0112461 A1 | 5/2005 | Amine et al. |
| 2003/0022487 A1 | 1/2003 | Yoon et al. | 2005/0118464 A1 | 6/2005 | Levanon |
| 2003/0024994 A1 | 2/2003 | Ladyansky | 2005/0130032 A1 | 6/2005 | Krasnov et al. |
| 2003/0029493 A1 | 2/2003 | Plessing | 2005/0133361 A1 | 6/2005 | Ding et al. |
| 2003/0030589 A1 | 2/2003 | Zurcher et al. | 2005/0141170 A1 | 6/2005 | Honda et al. |
| 2003/0035906 A1 | 2/2003 | Memarian et al. | 2005/0142447 A1 | 6/2005 | Nakai et al. |
| 2003/0036003 A1 | 2/2003 | Shchori et al. | 2005/0147877 A1 | 7/2005 | Tarnowski et al. |
| 2003/0042131 A1 | 3/2003 | Johnson | 2005/0158622 A1 | 7/2005 | Mizuta et al. |
| 2003/0044665 A1 | 3/2003 | Rastegar et al. | 2005/0170736 A1 | 8/2005 | Cok |
| 2003/0048635 A1 | 3/2003 | Knoerzer et al. | 2005/0175891 A1 | 8/2005 | Kameyama et al. |
| 2003/0063883 A1 | 4/2003 | Demaray et al. | 2005/0176181 A1 | 8/2005 | Burrows et al. |
| 2003/0064292 A1 | 4/2003 | Neudecker et al. | 2005/0181280 A1 | 8/2005 | Ceder et al. |
| 2003/0068559 A1 | 4/2003 | Armstrong et al. | 2005/0183946 A1 | 8/2005 | Pan et al. |
| 2003/0076642 A1 | 4/2003 | Shiner et al. | 2005/0189139 A1 | 9/2005 | Stole |
| 2003/0077914 A1 | 4/2003 | Le et al. | 2005/0208371 A1 | 9/2005 | Kim et al. |
| 2003/0079838 A1 | 5/2003 | Brcka | 2005/0239917 A1 | 10/2005 | Nelson et al. |
| 2003/0091904 A1 | 5/2003 | Munshi | 2005/0255828 A1* | 11/2005 | Fisher ............ 455/406 |
| 2003/0095463 A1 | 5/2003 | Shimada et al. | 2005/0266161 A1 | 12/2005 | Medeiros et al. |
| 2003/0097858 A1 | 5/2003 | Strohhofer et al. | 2006/0019504 A1 | 1/2006 | Taussig |
| 2003/0109903 A1 | 6/2003 | Berrang et al. | 2006/0021214 A1 | 2/2006 | Jenson et al. |
| 2003/0127319 A1 | 7/2003 | Demaray et al. | 2006/0021261 A1* | 2/2006 | Face ............ 36/132 |
| 2003/0134054 A1 | 7/2003 | Demaray et al. | 2006/0040177 A1 | 2/2006 | Onodera et al. |
| 2003/0141186 A1 | 7/2003 | Wang et al. | 2006/0046907 A1 | 3/2006 | Rastegar et al. |
| 2003/0143853 A1 | 7/2003 | Celii et al. | 2006/0054496 A1 | 3/2006 | Zhang et al. |
| 2003/0146877 A1 | 8/2003 | Mueller | 2006/0057283 A1 | 3/2006 | Zhang et al. |
| 2003/0152829 A1 | 8/2003 | Zhang et al. | 2006/0057304 A1 | 3/2006 | Zhang et al. |
| 2003/0162094 A1 | 8/2003 | Lee et al. | 2006/0063074 A1 | 3/2006 | Jenson et al. |
| 2003/0173207 A1 | 9/2003 | Zhang et al. | 2006/0071592 A1 | 4/2006 | Narasimhan et al. |
| 2003/0173208 A1 | 9/2003 | Pan et al. | 2006/0155545 A1 | 7/2006 | Jayne |
| 2003/0174391 A1 | 9/2003 | Pan et al. | 2006/0201583 A1 | 9/2006 | Michaluk et al. |
| 2003/0175142 A1 | 9/2003 | Milonopoulou et al. | 2006/0210779 A1 | 9/2006 | Weir et al. |
| 2003/0178623 A1 | 9/2003 | Nishiki et al. | 2006/0222954 A1 | 10/2006 | Skotheim et al. |
| 2003/0178637 A1 | 9/2003 | Chen et al. | 2006/0234130 A1 | 10/2006 | Inda |
| 2003/0180610 A1 | 9/2003 | Felde et al. | 2006/0237563 A1 | 10/2006 | Goto et al. |
| 2003/0185266 A1 | 10/2003 | Henrichs | 2006/0244581 A1* | 11/2006 | Breed et al. ............ 340/447 |
| 2003/0231106 A1 | 12/2003 | Shafer | 2006/0255435 A1 | 11/2006 | Fuergut et al. |
| 2003/0232248 A1 | 12/2003 | Iwamoto et al. | 2006/0286448 A1 | 12/2006 | Snyder et al. |
| 2004/0008587 A1 | 1/2004 | Siebott et al. | 2007/0009802 A1 | 1/2007 | Lee et al. |
| 2004/0015735 A1 | 1/2004 | Norman | 2007/0021156 A1* | 1/2007 | Hoong et al. ............ 455/575.1 |
| 2004/0023106 A1 | 2/2004 | Benson et al. | 2007/0023275 A1 | 2/2007 | Tanase et al. |
| 2004/0028875 A1 | 2/2004 | Van Rijn et al. | 2007/0037058 A1 | 2/2007 | Visco et al. |
| 2004/0029311 A1 | 2/2004 | Snyder et al. | 2007/0053139 A1 | 3/2007 | Zhang et al. |
| 2004/0038050 A1 | 2/2004 | Saijo et al. | 2007/0087230 A1 | 4/2007 | Jenson et al. |
| 2004/0043557 A1 | 3/2004 | Haukka et al. | 2007/0091543 A1 | 4/2007 | Gasse et al. |
| 2004/0048157 A1 | 3/2004 | Neudecker et al. | 2007/0125638 A1 | 6/2007 | Zhang et al. |
| 2004/0058237 A1 | 3/2004 | Higuchi et al. | 2007/0141468 A1 | 6/2007 | Barker |
| 2004/0072067 A1 | 4/2004 | Minami et al. | 2007/0148065 A1 | 6/2007 | Weir et al. |
| 2004/0077161 A1 | 4/2004 | Chen et al. | 2007/0148553 A1 | 6/2007 | Weppner |
| 2004/0078662 A1 | 4/2004 | Hamel et al. | 2007/0151661 A1 | 7/2007 | Mao et al. |
| 2004/0081415 A1 | 4/2004 | Demaray et al. | 2007/0164376 A1 | 7/2007 | Burrows et al. |
| 2004/0081860 A1 | 4/2004 | Hundt et al. | 2007/0166612 A1 | 7/2007 | Krasnov et al. |
| 2004/0085002 A1 | 5/2004 | Pearce | 2007/0184345 A1 | 8/2007 | Neudecker et al. |
| 2004/0101761 A1 | 5/2004 | Park et al. | 2007/0196682 A1 | 8/2007 | Visser et al. |
| 2004/0105644 A1 | 6/2004 | Dawes | 2007/0202395 A1 | 8/2007 | Snyder et al. |
| 2004/0106038 A1 | 6/2004 | Shimamura et al. | 2007/0205513 A1 | 9/2007 | Brunnbauer et al. |
| 2004/0106045 A1 | 6/2004 | Ugaji | 2007/0210459 A1 | 9/2007 | Burrows et al. |
| 2004/0106046 A1 | 6/2004 | Inda | 2007/0222681 A1 | 9/2007 | Greene et al. |
| 2004/0118700 A1 | 6/2004 | Schierle-Arndt et al. | 2007/0224951 A1 | 9/2007 | Gilb et al. |
| 2004/0126305 A1 | 7/2004 | Chen et al. | 2007/0229228 A1 | 10/2007 | Yamazaki et al. |
| 2004/0151986 A1 | 8/2004 | Park et al. | 2007/0235320 A1 | 10/2007 | White et al. |
| 2004/0161640 A1 | 8/2004 | Salot | 2007/0264564 A1 | 11/2007 | Johnson et al. |
| 2004/0175624 A1 | 9/2004 | Luski et al. | 2007/0278653 A1 | 12/2007 | Brunnbauer et al. |
| 2004/0188239 A1 | 9/2004 | Robison et al. | 2007/0298326 A1 | 12/2007 | Angell et al. |
| 2004/0209159 A1 | 10/2004 | Lee et al. | 2008/0003496 A1 | 1/2008 | Neudecker et al. |
| 2004/0212276 A1 | 10/2004 | Brantner et al. | 2008/0008936 A1 | 1/2008 | Mizuta et al. |
| 2004/0214079 A1 | 10/2004 | Simburger et al. | 2008/0014501 A1 | 1/2008 | Skotheim et al. |
| 2004/0219434 A1 | 11/2004 | Benson et al. | 2008/0057397 A1 | 3/2008 | Skotheim et al. |
| 2004/0245561 A1 | 12/2004 | Sakashita et al. | 2008/0150829 A1 | 6/2008 | Lin et al. |
| 2004/0258984 A1 | 12/2004 | Ariel et al. | 2008/0213672 A1 | 9/2008 | Skotheim et al. |
| 2004/0259305 A1 | 12/2004 | Demaray et al. | 2008/0233708 A1 | 9/2008 | Hisamatsu |
| 2005/0000794 A1 | 1/2005 | Demaray et al. | 2008/0254575 A1 | 10/2008 | Fuergut et al. |
| 2005/0006768 A1 | 1/2005 | Narasimhan et al. | 2008/0261107 A1 | 10/2008 | Snyder et al. |
| 2005/0048802 A1 | 3/2005 | Zhang et al. | 2008/0263855 A1 | 10/2008 | Li et al. |
| 2005/0070097 A1 | 3/2005 | Barmak et al. | 2008/0286651 A1 | 11/2008 | Neudecker et al. |
| 2005/0072458 A1 | 4/2005 | Goldstein | 2008/0297116 A1* | 12/2008 | Odaohhara et al. ............ 320/137 |
| 2005/0079418 A1 | 4/2005 | Kelley et al. | 2009/0092903 A1 | 4/2009 | Johnson et al. |
| 2005/0095506 A1 | 5/2005 | Klaassen | 2009/0124201 A1 | 5/2009 | Meskens |
| 2005/0105231 A1 | 5/2005 | Hamel et al. | 2009/0181303 A1 | 7/2009 | Neudecker et al. |
| 2005/0110457 A1 | 5/2005 | LaFollette et al. | 2009/0211353 A1* | 8/2009 | Gao et al. ............ 73/146.5 |

| | | | |
|---|---|---|---|
| 2009/0302226 A1 | 12/2009 | Schieber et al. | |
| 2009/0308936 A1 | 12/2009 | Nitzan et al. | |
| 2009/0312069 A1 | 12/2009 | Peng et al. | |
| 2010/0001079 A1 | 1/2010 | Martin et al. | |
| 2010/0032001 A1 | 2/2010 | Brantner | |
| 2010/0086853 A1 | 4/2010 | Venkatachalam et al. | |
| 2011/0267235 A1 | 11/2011 | Brommer et al. | |
| 2011/0304430 A1 | 12/2011 | Brommer et al. | |

FOREIGN PATENT DOCUMENTS

| | | |
|---|---|---|
| DE | 19824145 | 12/1999 |
| DE | 10 2005 014 427 | 9/2006 |
| DE | 10 2006 054 309 | 11/2006 |
| DE | 10 2008 016 665 | 10/2008 |
| DE | 10 2007 030604 | 1/2009 |
| EP | 0 510 883 | 10/1992 |
| EP | 0 639 655 | 2/1995 |
| EP | 0 652 308 | 5/1995 |
| EP | 0 820 088 | 1/1998 |
| EP | 1 068 899 | 1/2001 |
| EP | 0 867 985 | 2/2001 |
| EP | 1 092 689 | 4/2001 |
| EP | 1 189 080 | 3/2002 |
| EP | 1 713 024 | 10/2006 |
| FR | 2 861 218 | 4/2005 |
| FR | 2806198 | 9/2011 |
| JP | 55-009305 | 1/1980 |
| JP | 56-076060 | 6/1981 |
| JP | 56-156675 | 12/1981 |
| JP | 60-068558 | 4/1985 |
| JP | 61-269072 | 11/1986 |
| JP | 62-267944 | 11/1987 |
| JP | 63-290922 | 11/1988 |
| JP | 2000-162234 | 11/1988 |
| JP | 2-054764 | 2/1990 |
| JP | 2-230662 | 9/1990 |
| JP | 03-036962 | 2/1991 |
| JP | 4-058456 | 2/1992 |
| JP | 4-072049 | 3/1992 |
| JP | 6-010127 | 1/1994 |
| JP | 6-100333 | 4/1994 |
| JP | 7-233469 | 5/1995 |
| JP | 7-224379 | 8/1995 |
| JP | 08-114408 | 5/1996 |
| JP | 10-026571 | 1/1998 |
| JP | 10-239187 | 9/1998 |
| JP | 11-204088 | 7/1999 |
| JP | 2000-144435 | 5/2000 |
| JP | 2000-188099 | 7/2000 |
| JP | 2000-268867 | 9/2000 |
| JP | 2001-171812 | 6/2001 |
| JP | 2001-259494 | 9/2001 |
| JP | 2001-297764 | 10/2001 |
| JP | 2001-328198 | 11/2001 |
| JP | 2002-140776 | 5/2002 |
| JP | 2002-344115 | 11/2002 |
| JP | 2003-17040 | 1/2003 |
| JP | 2003-347045 | 12/2003 |
| JP | 2004-071305 | 3/2004 |
| JP | 2004-149849 | 5/2004 |
| JP | 2004-158268 | 6/2004 |
| JP | 2004-273436 | 9/2004 |
| JP | 2005-256101 | 9/2005 |
| JP | 2002-026412 | 2/2007 |
| JP | 7-107752 | 4/2007 |
| KR | 20020007881 | 1/2002 |
| KR | 20020017790 | 3/2002 |
| KR | 20020029813 | 4/2002 |
| KR | 20020038917 | 5/2002 |
| KR | 20030033913 | 5/2003 |
| KR | 20030042288 | 5/2003 |
| KR | 20030085252 | 11/2003 |
| RU | 2241281 | 11/2004 |
| WO | WO 9513629 | 5/1995 |
| WO | WO 9623085 | 8/1996 |
| WO | WO 9623217 | 8/1996 |
| WO | WO 9727344 | 7/1997 |
| WO | WO 9735044 | 9/1997 |
| WO | WO 9847196 | 10/1998 |
| WO | WO 9943034 | 8/1999 |
| WO | WO 9957770 | 11/1999 |
| WO | WO 0021898 | 4/2000 |
| WO | WO 0022742 | 4/2000 |
| WO | WO 0028607 | 5/2000 |
| WO | WO 0036665 | 6/2000 |
| WO | WO 0060682 | 10/2000 |
| WO | WO 0060689 | 10/2000 |
| WO | WO 0242516 | 5/2002 |
| WO | WO 0247187 | 6/2002 |
| WO | WO 02071506 | 9/2002 |
| WO | WO 02101857 | 12/2002 |
| WO | WO 03003485 | 1/2003 |
| WO | WO 03005477 | 1/2003 |
| WO | WO 03026039 | 3/2003 |
| WO | WO 03036670 | 5/2003 |
| WO | WO 03069714 | 8/2003 |
| WO | WO 03080325 | 10/2003 |
| WO | WO 03083166 | 10/2003 |
| WO | WO 2004012283 | 2/2004 |
| WO | WO 2004021532 | 3/2004 |
| WO | WO 2004061887 | 7/2004 |
| WO | WO 2004077519 | 9/2004 |
| WO | WO 2004086550 | 10/2004 |
| WO | WO 2004093223 | 10/2004 |
| WO | WO 2004106581 | 12/2004 |
| WO | WO 2004106582 | 12/2004 |
| WO | WO 2005008828 | 1/2005 |
| WO | WO 2005013394 | 2/2005 |
| WO | WO 2005038957 | 4/2005 |
| WO | WO 2005067645 | 7/2005 |
| WO | WO 2005085138 | 9/2005 |
| WO | WO 2005091405 | 9/2005 |
| WO | WO 2006063308 | 6/2006 |
| WO | WO 2006085307 | 8/2006 |
| WO | WO 2007016781 | 2/2007 |
| WO | WO 2007019855 | 2/2007 |
| WO | WO 2007027535 | 3/2007 |
| WO | WO 2007095604 | 8/2007 |
| WO | WO 2008036731 | 3/2008 |

OTHER PUBLICATIONS

Dobkin, D.M., "Silicon Dioxide: Properties and Applications".
Sarro, P., "Silicon Carbide as a New MEMS Technology," Sensors and Actuators 82, 210-218 (2000).
Hwang et al., "Characterization of Sputter-Deposited $LiMn_2O_4$ Thin Films for Rechargeable Microbatteries," 141(12) J. Electrochem. Soc. 3296-99 (1994).
Jones et al., 53-56 Solid State Ionics 628 (1992).
Mattox "Handbook of Physical Vapor Deposition (PVD) Processing, Society of Vacuum Coaters," Albuquerque, New Mexico 660f and 692ff, Noyes Publications (1998).
Hill, R. et al., "Large Area Deposition by Mid-Frequency AC Sputtering," Society of Vacuum Coaters, 41st Annual Tech. Conference Proceedings, 197-202 (1998).
Macák, Karol et al., "Ionized Sputter Deposition Using an Extremely High Plasma Density Pulsed Magnetron Discharge," J. Vac. Sci. Technol. A 18(4):1533-37 (2000).
Balanis, Constantine A., "Antenna Theory: Analysis and Design," 3rd Ed., pp. 817-820 (John Wiley & Sons, Inc. Publication, 2005).
Starner "Human-Powered Wearable Computing" 35(3&4) IBM Sys. J. 618-29 (1996)[1].
Strohhofer, C. and Polman, A. "Energy transfer to $Er^{3+}$ in Ag ion-exchanged glass," FOM Institute for Atomic and Molecular Physics, 10 pages (2001).
Sugiyama, A. et al., "Gas Permeation Through the Pinholes of Plastic Film Laminated with Aluminum Foil," Vuoto XXVIII(1-2):51-54 (1999).
Tervonen, A. "Challenges and opportunities for integrated optics in optical networks," SPIE 3620:2-11 (1999).
Ting, C.Y. et al., "Study of planarized sputter-deposited $SiO_2$" J. Vac. Sci Technol, 15(3):1105-1112 (1978).
Tomaszewski, H. et al., "Yttria-stabilized zirconia thin films grown by reactive r.f. magnetron sputtering," Thin Solid Films 287: 104-109 (1996).

Triechel, O. and Kirchhoff, V., "The influences of pulsed magnetron sputtering on topography and crystallinity of $TiO_2$ films on glass," Surface and Coating Technology 123:268-272 (2000).

Tukamoto, H. and West, A.R., "Electronic Conductivity of $LiCoO_s$ and Its Enhancement by Magnesium Doping," J. Electrochem. Soc 144(9):3164-3168 (1997).

Van Dover, R.B., "Amorphous Lanthanide-Doped $TiO_x$ Dielectric Films," Appl. Phys. Lett. 74(20):3041-3043 (1999).

Viljanen, J. and Leppihalme, M., "Planner Optical Coupling Elements for Multimode Fibers with Two-Step Ion Migration Process," Applied Physics 24(1):61-63 (1981).

Villegas, M.A. et al., "Optical spectroscopy of a soda lime glass exchanged with silver," Phys. Chem. Glasses 37(6):248-253 (1996).

Von Rottkay, K. et al., "Influences of stoichiometry on electrochromic cerium-titanium oxide compounds," Presented at the $11^{th}$ Int'l Conference of Solid State Ionics, Honolulu, Hawaii, Nov. 19, 1997, Published in Solid State Ionics 113-115:425-430. (1998).

Wang, B. et al., "Characterization of Thin-Film Rechargeable Lithium Batteries with Lithium Cobalt Oxide Cathodes," J. Electrochem. Soc. 143:3203-13 (1996).

Westlinder, J. et al., "Simulations and Dielectric Characterization of Reactive dc Magnetron Cosputtered $(Ta_2O_5)_{1-x}(TiO_2)_x$ Thin Films," J Vac. Sci. Technol. B 20(3):855-861 (May/Jun. 2002).

Wilkes, K.E., "Gas Permeation Through Vacuum Barrier Films and its Effect on VIP Thermal Performance," presented at the Vacuum Insulation Panel Symp., Baltimore, Maryland, 21 pages (May 3, 1999).

Yanagawa, H. et al., "Index-and-Dimensional Taper and Its Application to Photonic Devices," J. Lightwave Technology 10(5):587-591 (1992).

Yoshikawa, K. et al., "Spray formed aluminum alloys for sputtering targets," Powder Metallurgy 43(3): 198-199 (2000).

Zhang, H. et al., "High Dielectric Strength, High k $TiO_2$ Films by Pulsed DC, Reactive Sputter Deposition," 5 pages (2001).

Abraham, K.M. et al., "Inorganic-organic composite solid polymer electrolytes," 147(4) J. Electrochem. Soc. 1251-56 (2000).

Appetecchi, G.B. et al., "Composite polymer electrolytes with improved lithium metal electrode interfacial properties," 145(12) J. Electrochem. Soc. 4126-32 (1998).

Bates, J.B. et al., "Electrical properties of amorphous lithium electrolyte thin films," 53-56 Solid State Ionics 647-54 (1992).

Abrahams, I., "$Li_6Zr_2O_7$, a new anion vacancy ccp based structure, determined by ab initio powder diffraction methods," 104 J. Solid State Chem. 397-403 (1993).

Amatucci, G. et al., "Lithium scandium phosphate-based electrolytes for solid state lithium rechargeable microbatteries," 60 Solid State Ionics 357-65 (1993).

Yu, X. et al., "A stable thin-film lithium electrolyte: lithium phosphorus oxynitride," 144(2) J. Electrochem. Soc. 524-532 (1997).

Delmas, C. et al., "Des conducteurs ioniques pseudo-bidimensionnels $Li_8MO_6$ (M=Zr, Sn), $Li_7LO_6$ (L=Nb, Ta) et $Li_6In_2O_6$," 14 Mat. Res. Bull. 619-25 (1979).

Hu, Y-W. et al., "Ionic conductivity of lithium phosphate-doped lithium orthosilicate," 11 Mat. Res. Bull. 1227-30 (1976).

Neudecker, B. et al., "$Li_9SiAlO_8$: a lithium ion electrolyte for voltages above 5.4 V," 143(7) J. Electrochem. Soc. 2198-203 (1996).

Ohno, H. et al., "Electrical conductivity of a sintered pellet of octalithium zirconate," 132 J. Nucl. Mat. 222-30 (1985).

Scholder, V. et al., "Über Zirkonate, Hafnate und Thorate von Barium, Strontium, Lithium und Natrium," Zeitschrift für Anorganische und Allgemeine Chemie, Band 362, pp. 149-168 (1968).

Affinito, J.D. et al., "PML/oxide/PML barrier layer performance differences arising from use of UV or electron beam polymerization of the PML layers," Thin Solid Films 308-309: 19-25 (1997).

Affinito, J.D. et al., "Polymer-oxide transparent barrier layers," Society of Vacuum Coaters, $39^{th}$ Ann. Technical Conference Proceedings, May 5-10, 1996, Philadelphia, PA, pp. 392-397 (1996).

Alder, T. et al., "High-efficiency fiber-to-chip coupling using low-loss tapered single-mode fiber," IEEE Photonics Tech. Lett. 12(8): 1016-1018 (2000).

Almeida, V.R. et al., "Nanotaper for compact mode conversion," Optics Letters 28(15): 1302-1304 (2003).

Anh et al., "Significant Suppression of Leakage Current in $(Ba,Sr)TiO_3$ Thin Films by Ni or Mn Doping," J. Appl. Phys.,92(5): 2651-2654 (Sep. 2002).

Asghari, M. and Dawnay, E., "ASOC™—a manufacturing integrated optics technology," SPIE 3620: 252-262 (Jan. 1999).

Barbier, D. et al., "Amplifying four-wavelength combiner, based on erbium/ytterbium-doped waveguide amplifiers and integrated splitters," IEEE Photonics Tech. Lett. 9:315-317 (1997).

Barbier, D., "Performances and potential applications of erbium doped planar waveguide amplifiers and lasers," Proc. OAA, Victoria, BC, Canada, pp. 58-63 (Jul. 21-23, 1997).

Bates et al., "Thin-Film Lithium Batteries" in New Trends in Electrochemical Technology: Energy Storage Systems for Electronics (T. Osaka & M. Dana eds. Gordon and Breach 2000).

Beach R.J., "Theory and optimization of lens ducts," Applied Optics 35(12): 2005-2015 (1996).

Belkind, A. et al., "Pulsed-DC Reactive Sputtering of Dielectrics: Pulsing Parameter Effects," $43^{rd}$ Annual Technical Conference Proceedings (2000).

Belkind, A. et al., "Using pulsed direct current power for reactive sputtering of $Al_2O_3$," J. Vac. Sci. Technol. A 17(4): 1934-1940 (1999).

Bestwick, T., "ASOC™ silicon integrated optics technology," SPIE 3631: 182-190 (1999).

Borsella, E. et al., "Structural incorporation of silver in soda-lime glass by the ion-exchange process: a photoluminescence spectroscopy study," Applied Physics A 71: 125-132 (2000).

Byer, R.L., "Nonlinear optics and solid-state lasers: 2000," IEEE J. Selected Topics in Quantum Electronics 6(6): 911-930 (2000).

Campbell, S.A. et al., "Titanium dioxide (TiO2)-based gate insulators," IBM J. Res. Develop. 43(3): 383-392 (1999).

Inaguma, Yoshiyuki, "High Ionic Conductivity in Lithium Lanthanum Titanate," Solid State Communications,vol. 86, No. 10, pp. 689-693 (1993).

Guy, D., "Novel Architecture of Composite Electrode for Optimization of Lithium Battery Performance," Journal of Power Sources 157, pp. 438-442 (2006).

Wolfenstine, J., "Electrical Conductivity and Charge Compensation in Ta Doped $Li_4Ti_5O_{12}$," Journal of Power Sources 180, pp. 582-585 (2008).

Balanis, Constantine A., "Antenna Theory: Analysis and Design," 3rd Ed., pp. 811-820 (2005).

Lee, B.H. et al., "Effects of interfacial layer growth on the electrical characteristics of thin titanium oxide films on silion," Appl. Phys. Lett. 74(21):3143-3145 (1999).

Lee, K.K. et al., "Effect of size and roughness on light transmission in a $Si/SiO_2$ waveguide: Experiments and model," Appl. Phys. Lett. 77(11):1617-1619 (2000).

Love, J.D. et al., "Quantifying Loss Minimisation in Single-Mode Fibre Tapers," Electronics Letters 22(17):912-914 (1986).

Mardare, D. and Rusu, G.I., "On the structure of Titanium Oxide Thin Films," Andalele Stiintifice Ale Universitatii IASI, Romania, pp. 201-208 (1999).

Marques, P.V.S. et al., "Planar Silica-on-Silicon Waveguide Lasers Based in Two Layers Core Devices," $10^{th}$ European Conference on Integrated Optics, Session WeB2, pp. 79-82 (2001).

Meijerink, A. et al, "Luminescence of $Ag^+$ in Crystalline and Glassy $Srb_4O_7$," J. Physics Chem. Solids 54(8):901-906 (1993).

Mesnaoui, M. et al, "Spectroscopic properties of $Ag^+$ ions in phosphate glasses of $NaPO_3—AgPO_3$ system," Eur. J. Solid State Inorg. Chem. 29:1001-1013 (1992).

Mitomi, O. et al., "Design of a Single-Mode Tapered Waveguide for Low-Loss Chip-to-Fiber Coupling," IEEE J. Quantum Electronics 30(8): 1787-1793 (1994).

Mizuno, Y. et al "Temperature dependence of oxide decomposition on titanium surfaces in UHV," J. Vac. Sci & Tech. A. 20(5): 1716-1721 (2002).

Ohkubo, H. et al., Polarization-Insensitive Arrayed-Waveguide Grating Using Pure $SiO_2$ Cladding, Fifth Optoelectronics and Communication Conference (OECC 2000) Technical Digest, pp. 366-367 (2000).

Ohmi, S. et al., "Rare earth mental oxides for high-K fate insulator," VLSI Design 2004, 1 Page (2004).

Ohtsuki, T., et al., "Gain Characteristics of high concentration $Er^{3+}$-doped phosphate glass waveguide," J. Appl. Phys. 78(6):3617-3621 (1995).

Ono, H. et al., "Design of a Low-loss Y-branch Optical Waveguide," Fifth Optoelectronic and Communications Conference (OECC 2000) Technical Digest, pp. 502-503 (2000).

Padmini, P. et al. "Realization of High Tunability Barium Strontium Titanate Thin Films by rf Megnetron Sputtering," Appl. Phys. Lett. 75(20):3186-3188 (1999).

Pan, T. et al., "Planar $Er^{3+}$-doped aluminosilicate waveguide amplifier with more than 10 dB gain across C-band," Optical Society of America, 3 pages (2000).

Park et al., "Characteristics of Pt Thin Film on the Conducting Ceramics TiO and Ebonex ($Ti_4O_7$) as Electrode Materials," Thin Solid Films 258: 5-9 (1995).

Peters, D.P. et al., "Formation mechanism of silver nanocrystals made by ion irradiation of $Na^+$—$Ag^+$ ion-exchanged sodalime silicate glass," Nuclear Instruments and Methods in Physics Research B 168:237-244 (2000).

Rajarajan, M. et al., "Numerical Study of Spot-Size Expanders fro an Efficient OEIC to SMF Coupling," IEEE Photonics Technology Letters 10(8): 1082-1084 (1998).

Ramaswamy, R.V. et al., "Ion-Exchange Glass Waveguides: A Review," J. Lightwave Technology 6(6): 984-1002 (1988).

Roberts, S.W. et al., "The Photoluminescence of Erbium-doped Silicon Monoxide," University of Southampton, Department of Electronics and Computer Science Research Journal, 7 pages (1996).

Saha et al., "Large Reduction of Leakage Current by Graded-Layer La Doping in (Ba0.5,Sr0.5)TiO3 Thin Films," Appl. Phys. Lett. 79(1): 111-113 (Jul. 2001).

Sanyo Vacuum Industries Co., Ltd. Products Infor, $TiO_2$, (2003), 1 page, http://www.sanyovac.co.jp/Englishweb/products?ETiO2.htm.

Schermer, R. et al., "Investigation of Mesa Dielectric Waveguides," Proceedings of the OSA Integrated Photonics Research Topical Meeting and Exhibit, Paper No. IWB3, 3 pages (2001).

Schiller, S. et al., "PVD Coating of Plastic Webs and Sheets with High Rates on Large Areas," European Materials Research Society 1999 Spring Meeting, Jun. 1-4, 1999, Strasbourg, France, 13 pages (1999).

Scholl, R., "Power Supplies for Pulsed Plasma Technologies: State-of-the-Art and Outlook," Advances Energy Industries, Inc. 1-8 (1999).

Scholl, R., "Power Systems for Reactive Sputtering of Insulating Films," Advances Energy Industries, Inc., 1-8 (Aug. 2001).

Second International Symposium of Polymer Surface Modification: Relevance to Adhesion, Preliminary Program, 13 pages (1999).

Seventh International Conference on $TiO_2$ Photocatalysis: Fundamentals & Applications, Toronto, Ontario, Canada, Final Program, 7 pages (Nov. 17-21, 2002).

Sewell, P. et al., "Rib Waveguide Spot-Size Transformers: Modal Properties," J Lightwave Technology 17(5):848-856 (1999).

Shaw, D.G. et al., "Use of Vapor Deposited Acrylate Coatings to Improve the Barrier Properties of Metallized Film," Society of Vacuum Coaters, $37^{th}$ Annual Technical Conference Proceedings, pp. 240-244 (1994).

Shin, J.C. et al. "Dielectric and Electrical Properties of Sputter Grown $(Ba,Se)TiO_3$ Thin Films," J. Appl. Phys. 86(1):506-513 (1999).

Shmulovich, J. et al., "Recent progress in Erbium-doped waveguide amplifiers," Bell Laboratories, pp. 35-37 (1999).

Slooff, L.H. et al., "Optical properties of Erbium-doped organic polydentate cage complexes," J. Appl. Phys. 83(1):497-503 (1998).

Smith, R.E. et al., "Reduced Coupling Loss Using a Tapered-Rib Adiabatic-Following Fiber Coupler," IEEE Photonics Technology Lett. 8(8):1052-1054 (1996).

Snoeks, E. et al., "Cooperative upconversion in erbium-implanted soda-lime silicate glass optical waveguides," J. Opt. Soc. Am. B 12(8): 1468-1474 (1995).

Chang, C.Y. and Sze, S.M. (eds.), in ULSI Technology, The McGraw-Hill Companies, Inc., Nyew York, Chapter 4, pp. 169-170 and 226-231 (1996).

Chen, G. et al., "Development of supported bifunctional electrocatalysts for unitized regenerative fuel cells," J. Electrochemical Society 149(8): A1092-A1099 (2002).

Choi, Y.B. et al., "Er-Al-codoped silicate planar light waveguide-type amplifier fabricated by radio-frequency sputtering," Optics Letters 25(4): 263-265 (2000).

Choy et al., "Eu-Doped Y2O3 Phosphor Films Produced by Electrostatic-Assisted Chemical Vapor Deposition," J. Mater. Res. 14(7): 3111-3114 (Jul. 1999).

Cocorullo, G. et al., "Amorphous silicon waveguides and light modulators for integrated photonics realized by low-temperature plasma-enhanced chemical-vapor deposition," Optics Lett. 21(24): 2002-2004 (1996).

Cooksey, K. et al., "Predicting permeability & Transmission rate for multilayer materials," Food Technology 53(9): 60-63 (1999).

Crowder, M.A. et al., "Low-temperature single-crystal Si TFT's fabricated on Si films processed via sequential lateral solidification," IEEE Electron Device Lett. 19(8): 306-308 (1998).

Delavaux, J-M. et al., "Integrated optics erbium ytterbium amplifier system in 10Gb/s fiber transmission experiment," $22^{nd}$ European Conference on Optical Communication, Osla, I.123-I.126 (1996).

Distributed Energy Resources: Fuel Cells, Projects, 4 pages http://www.eere.energy.gov/der/fuel_cells/projects.html (2003).

Dorey, R.A., "Low temperature micromoulding of functional ceramic devices," Grant summary for GR/S84156/01 for the UK Engineering and Physical Sciences Research Council, 2 pages (2004).

DuPont Teijin Films, Mylar 200 SBL 300, Product Information, 4 pages (2000).

Electrometals Technologies Limited, Financial Report for 2002, Corporate Directory, Chairman's review, Review of Operations, 10 pages (2002).

E-Tek website: FAQ, Inside E-Tek, E-TEk News, Products; http://www.etek-inc.com/, 10 pages (2003).

Flytzanis, C. et al., "Nonlinear optics in composite materials," in Progress in Optics XXIX, Elsevier Science Publishers B.V., pp. 323-425 (1991).

Frazao, O. et al., "EDFA gain flattening using long-period fibre gratings based on the electric arc technique," Proc. London Comm. Symp. 2001, London, England, 3 pages (2001).

Fujii, M. et al., "1.54 µm photoluminescence of $Er^{3+}$ doped into $SiO_2$ films containing Si nanocrystals: evidence for energy transfer from Si nanocrystals for $Er^{3+}$," Appl. Phys. Lett. 71(9): 1198-1200 (1997).

Garcia, C. et al., "Size dependence of lifetime and absorption cross section of Si nanocrystals embedded in $SiO_2$," Appl. Phys. Lett. 82(10): 1595-1597 (2003).

Goossens, A. et al., "Sensitization of $TiO_2$ with p-type semiconductor polymers," Chem. Phys. Lett. 287: 148 (1998).

Greene, J.E. et al., "Morphological and electrical properties of rf sputtered $Y_2O_3$-doped $ZrO_2$ thin films," J. Vac. Sci. Tech. 13(1): 72-75 (1976).

Han, H.-S. et al., "Optical gain at 1.54 µm in Erbium-doped Silicon nanocluster sensitized waveguide," Appl. Phys. Lett. 79(27): 4568-4570 (2001).

Hayakawa, T. et al., "Enhanced fluorescence from $Eu^{3+}$ owing to surface plasma oscillation of silver particles in glass," J. Non-Crystalline Solids 259: 16-22 (1999).

Hayakawa, T. et al., "Field enhancement effect of small Ag particles on the fluorescence from $Eu^{3+}$-doped $SiO_2$ glass," Appl. Phys. Lett. 74(11): 1513-1515 (1999).

Hayfield, P.C.S., I Development of a New Material-Monolithic $Ti_4O_7$ Ebonix® Ceramic, Royal Society of Chemistry, Cambridge, Table of Contents, 4 pages (2002).

Hehlen, M.P. et al., "Spectroscopic properties of $Er^{3+}$- and $Yb^{3+}$-doped soda-lime silicate and aluminosilicate glasses," Physical Review B 56(15): 9302-9318 (1997).

Hehlen, M.P. et al., "Uniform upconversion in high-concentration $Er^{3+}$-doped soda lime silicate and aluminosilicate glasses," Optics Letters 22(11); 772-774 (1997).

Horst, F. et al., "Compact, tunable optical devices in silicon-oxynitride waveguide technology," Top. Meeting Integrated Photonics Res. '00, Quebec, Canada, p. IThFI, 3 pages (2000).

Howson, R.P., "The reactive sputtering of oxides and nitrides," Pure & Appl. Chem. 66(6): 1311-1318 (1994).

Hubner, J. and Guldberg-Kjaer, S., "Planar Er- and Yb-doped amplifiers and lasers," COM Technical University of Denmark, 10th European Conf. on Integrated Optics, Session WeB2, pp. 71-74 (2001).

Hwang et al., "Characterization of sputter-deposited LiMn2O4 thin films for rechargeable microbatteries," 141(12) J. Electrochem. Soc. 3296-99 (1994).

Hwang, M-S. et al., "The effect of pulsed magnetron sputtering on the properties of iridium tin oxide thin films," Surface and Coatings Tech. 171: 29-33 (2003).

Im, J.S. and Sposili, R.S., "Crystalline Si films for integrated active-matrix liquid crystal displays," MRS Bulletin, pp. 39-48 (1996).

Im, J.S. et al., "Controlled super-lateral growth of Si-films for microstructural manipulation and optimization," Physica Status Solidi (A) 166(2): 603-617 (1998).

Im, J.S. et al., "Single-crystal Si films for thin-film transistor devices," Appl. Physics Lett. 70(25): 3434-3436 (1997).

Itoh, M. et al., "Large reduction of singlemode-fibre coupling loss in 1.5% Δ planar lightwave circuits using spot-size converters," Electronics Letters 38(2): 72-74 (2002).

Jackson, M.K. and Movassaghi, M., "An accurate compact EFA model," Eur. Conf. Optical Comm., Munich, Germany, 2 pages (2000).

Janssen, R. et al., "Photoinduced electron transfer from conjugated polymers onto nanocrystalline $TiO_2$," Synthet. Metal., 1 page (1999).

Johnson, J.E. et al., "Monolithically integrated semiconductor optical amplifier and electroabsorption modulator with dual-waveguide spot-size converter input," IEEE J. Selected topics in Quantum Electronics 6(1): 19-25 (2000).

Jonsson, L.B. et al., "Frequency response in pulsed DC reactive sputtering processes," Thin Solid Films 365: 43-48 (2000).

Kato, K. and Inoue, Y., "Recent progress on PLC hybrid integration," SPIE 3631: 28-36 (1999).

Kato, K. and Tohmori, Y., "PLC hybrid integration technology and its application to photonic components," IEEE J. Selected Topics in Quantum Electronics 6(1): 4-13 (2000).

Kelly, P.J. and Arnell, Rd., "Control of the structure and properties of aluminum oxide coatings deposited by pulsed magnetron sputtering," J. Vac. Sci. Technol. A 17(3): 945-953 (1999).

Kelly, P.J. et al., "A novel technique for the deposition of aluminum-doped zinc oxide films," Thin Solid Films 426(1-2): 111-116 (2003).

Kelly, P.J. et al., "Reactive pulsed magnetron sputtering process for alumina films," J. Vac. Sci. Technol. A 18(6): 2890-2896 (2000).

Kik, P.G. and Polman, A., "Gain limiting processes in Er-doped Si nanocrystal waveguides in $SiO_2$," J. Appl. Phys. 91(1): 536-536 (2002).

Kim et al., "Correlation Between the Microstructures and the Cycling Performance of $RuO_2$ Electrodes for Thin-Film Microsupercapacitros," J. Vac. Sci. Technol. B20(5): 1827-1832 (Sep. 2002).

Kim, D-W. et al. "Mixture Behavior and Microwave Dielectric Properties in the Low-fired $TiO_2$—CuO System," Jpn. J. Appl. Phys. 39:2696-2700 (2000).

Kim, H-K. et al., "Characteristics of rapid-thermal-annealed LiCoO2 cathode film for an all-solid-state thin film microbattery," J. Vac. Sci. Technol. A 22(4): 1182-1187 (2004).

Kim, J-Y. et al. "Frequency-dependent pulsed direct current magnetron sputtering of titanium oxide films," J. Vac. Sci. Technol. A 19(2):429-434 (2001).

Ladouceur, F. and Love, J.D., in: Silica-based Buried Channel Waveguides and Devices, Chapman & Hall, London, Table of Contents, 6 pages (1996).

Ladouceur, F. et al., "Effect of side wall roughness in buried channel waveguides," IEEE Proc. Optoelectron. 141(4):242-248 (1994).

Lamb, W. and Zeiler, R., Designing Non-Foil Containing Skins for Vacuum Insulation Panel (VIP) Application, Vuoto XXVIII(1-2):55-58 (1999).

Lamb, W.B., "Designing Nonfoil Containing Skins for VIP Applications," DuPont VIA Symposium Presentation, 35 Pages (1999).

Lange, M.R. et al, "High Gain Ultra-Short Length Phosphate glass Erbium-Doped Fiber Amplifier Material," OSA Optical Fiber Communications (OFC), 3 Pages (2002).

Laporta, P. et al, "Diode-pumped cw bulk Er:Yb: glass laser," Optics Letters 16(24):1952-1954 (1991).

Laurent-Lund, C. et al., "PECVD Grown Multiple Core Planar Waveguides with Extremely Low Interface Reflections and Losses," IEEE Photonics Tech. Lett. 10(10):1431-1433 (1998).

* cited by examiner

ENVIRONMENTALLY-POWERED WIRELESS SENSOR MODULE

RELATED APPLICATIONS

This application is related to and claims priority under 35 U.S.C. §119 to U.S. Provisional Patent Application Ser. No. 61/103,746, entitled "Environmentally-Powered Wireless Sensor Module," filed on Oct. 8, 2008, which is incorporated herein by reference in its entirety.

This application is related to U.S. patent application Ser. No. 11/561,277, entitled "Hybrid Thin-Film Battery," filed on Nov. 17, 2006, U.S. patent application Ser. No. 11/687,032, entitled "Metal Film Encapsulation," filed on Mar. 16, 2007, U.S. patent application Ser. No. 11/748,471, entitled "Thin Film Battery on an Integrated Circuit or Circuit Board and Method Thereof," filed on May 14, 2007, U.S. Patent Application Ser. No. 61/087,927, entitled "Energy Device with Integral Collector Surface for Electromagnetic Energy Harvesting and Method Thereof," filed on Aug. 11, 2008, and U.S. Patent Application Ser. No. 61/096,415, entitled "Energy Device with Integral Collector Surface for Electromagnetic Energy Harvesting and Method Thereof," filed on Sep. 12, 2008, which are incorporated herein by reference in their entirety.

TECHNICAL FIELD AND BACKGROUND OF THE INVENTION

This invention relates to an apparatus, method, and system for communicating data. More particularly, this invention relates to a device capable of being incorporated on a substrate and may be powered by harvesting energy from any ambient source, such as, for example, radio frequency, solar power, wind, vibration or human activity which may be stored and/or converted to communication signals to transmit information.

As electronics have become smaller and more durable, there has been a continuous progression towards using electrical devices in ways never before thought possible. The energy source used to operate these devices may typically be a battery, which can be embedded within the electronics and configured for a single use, configured to be replaceable, or configured to be rechargeable. Each of these current options have shortcomings, as an embedded battery may render associated electronics useless once the battery is discharged or damaged, replaceable batteries require additional space and material to house, and an externally rechargeable battery requires additional material for a connecting plug and a battery charger. Each of these options is typically not ideal, as applications tend to demand equipment that can be lighter, without additional power cords and usable during times when access to an electrical wall outlet or other external power source is unavailable.

Thus, a demand exists to have an electronic device that does not require large batteries and may be able to generate its own energy.

As the ability, desire, and reality of global travel has become more commonplace, consumers often find themselves in need of portable electronic devices. Powering these devices may be a challenge, however, as there are many different voltages and frequencies of electricity power supplies in different countries. Electrical wall outlets are typically needed to charge many consumer devices ranging from electric shavers to computers, cell phones, and other devices that may send or receive signals.

Thus, a demand exists to have an electronic device that may be capable of operating without the use of an electrical wall outlet.

SUMMARY OF INVENTION

Ambient energy exists in many forms and in abundant quantity, providing an opportunity to put that energy to a beneficial electrical use with the assistance of an energy harvesting device. The energy harvester may include, for example, a device that converts specific types of ambient energy into electrical energy, which can then be stored in an electrical energy storage device such as a battery or capacitor. Depending on the application, harvested energy may, for example, be used instantaneously or stored in a component such as a battery and used at defined time intervals or when requested by a remote device.

It is one object of certain exemplary embodiments of this invention to use an energy harvester, such as, for example, a piezoelectric mechanism, and connect it to or incorporate it onto a substrate to harvest energy from one or more non-conventional sources and use that energy to recharge a device such as a battery that may be located such that it, for example, is an integral and inseparable part of a substrate.

The present invention may include, for example, a unique arrangement of a microcontroller, a signal transmitter, a signal receiver, an energy storage device and an energy harvester. In some embodiments, the energy harvester may be a piezoelectric sensor that converts motion/vibration energy into electric energy, wherein the converted energy may be used to recharge a battery, thereby providing power to a signal receiver/transmitter. The signal receiver/transmitter may be, for example, a ZigBee transceiver. In other embodiments, the piezoelectric mechanism may perform a dual function as a converter of motion energy to electrical energy and also a pedometer.

Certain embodiments of the present invention are also included in a system having a transmitter for transmitting a message to an external receiver. The system may also have one or more sensors that may be monitored by a microcontroller. Certain signals from the sensors may be processed by the microcontroller and the processed information may be transmitted to a receiver that may be located remotely.

In some embodiments of the invention, the device may receive a signal from one or more GPS satellites to determine the geographical location of said device.

For improved performance in this application, also disclosed is an example of a manufacturing process for a thin-film battery having a heat and pressure-resilient separation layer for incorporating the battery cell onto a substrate.

BRIEF DESCRIPTION OF DRAWING

Some features and advantages of the invention are described with reference to the drawing of a certain preferred embodiment, which is intended to illustrate and not to limit the invention.

The accompanying drawings, which are included to provide a further understanding of the invention and are incorporated in and constitute a part of this specification, illustrate exemplary embodiments of the invention that together with the description serve to explain the principles of the invention.

DETAILED DESCRIPTION OF PREFERRED EMBODIMENTS

It is to be understood that the present invention is not limited to the particular methodology, compounds, materials, manufacturing techniques, uses, and applications described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements, and includes equivalents thereof known to those skilled in the art. Similarly, for another example, a reference to "a step" or "a means" is a reference to one or more steps or means and may include sub-steps or subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

Unless defined otherwise, all technical and scientific terms used herein have the same meanings as commonly understood by one of ordinary skill in the art to which this invention belongs. Preferred methods, techniques, devices and materials are described although any methods, techniques, devices, or materials similar or equivalent to those described may be used in the practice or testing of the present invention. Structures described herein are to be understood also to refer to functional equivalents of such structures.

All patents and other publications are incorporated herein by reference for the purpose of describing and disclosing, for example, the methodologies described in such publications that might be useful in connection with the present invention. These publications are provided solely for their disclosure prior to the filing date of the present application. Nothing in this regard should be construed as an admission that the inventors are not entitled to antedate such disclosure by virtue of prior invention or for any other reason.

Figure 1:
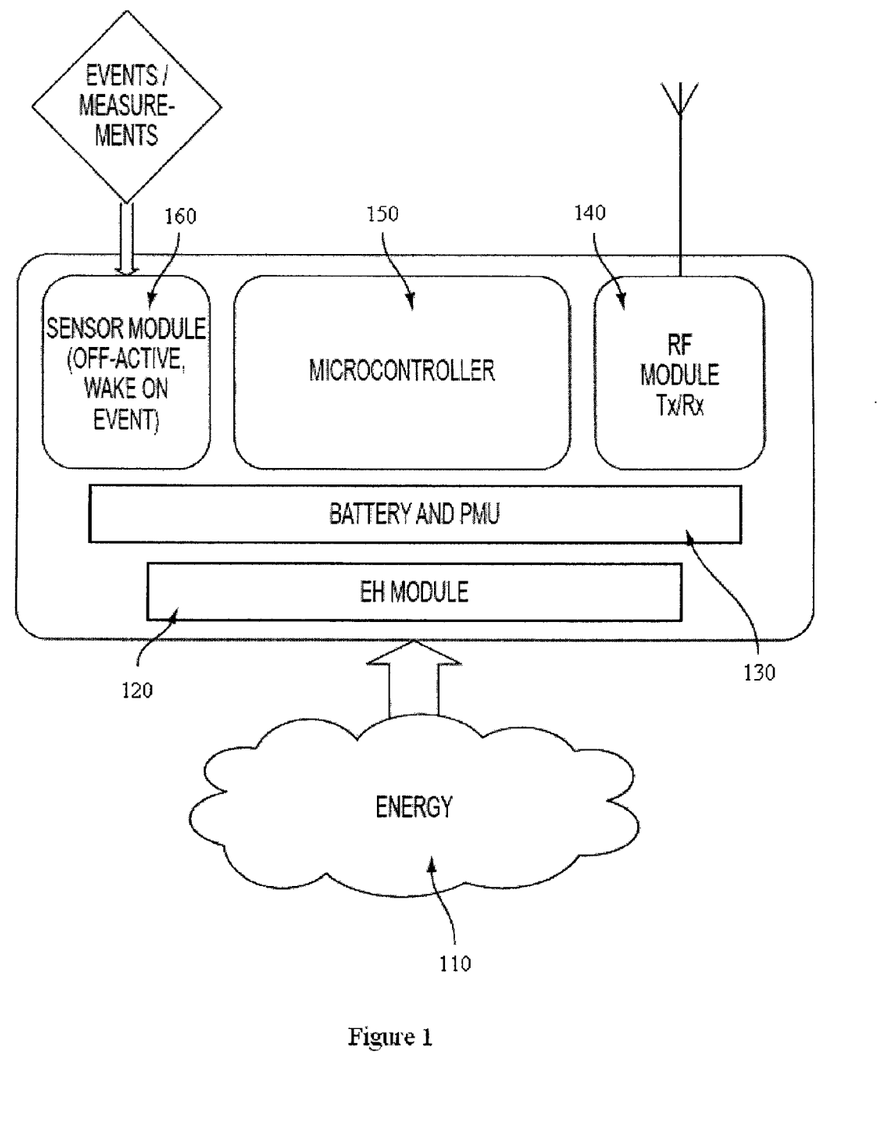
FIG. 1 is a diagram of an embodiment of the present invention showing the subcomponents of the device.

FIG. 1 shows the detailed process occurring within the present invention. The energy 110, which may result from radio frequency, solar power, wind power, vibration, human activity such as walking or jogging, water movement, temperature variations and rotational movements reaches an energy harvesting mechanism 120 and may be converted into a usable and storable form of energy, such as, for example, electricity. The energy harvesting mechanism 120 uses the harvested energy to recharge a rechargeable energy storage device 130. In some embodiments, the process of energy harvesting and recharging an energy storage device may be performed under the monitoring and regulation of, for example, a power management unit 130. The energy storage device 130 may store the energy and, when needed, power the microcontroller 150 and the transmitter and/or receiver 140 depending on whether a signal is being sent out, received, or both. The transmitter and/or receiver 140 may be, for example, a ZigBee transceiver. The transceiver may be part of a wireless mesh network, which is one of the possible implementations of a Zigbee network. Independent nodes in a mesh may provide self repairing features if a failure at one of the nodes is discovered. Therefore, mesh nodes relying on energy harvesting may be more robust over the long run, being able to "hibernate" during extended periods when the energy source is not available. A sensor 160 may be used to measure any desirable physical quantities depending on the use of the device.

Figure 2:
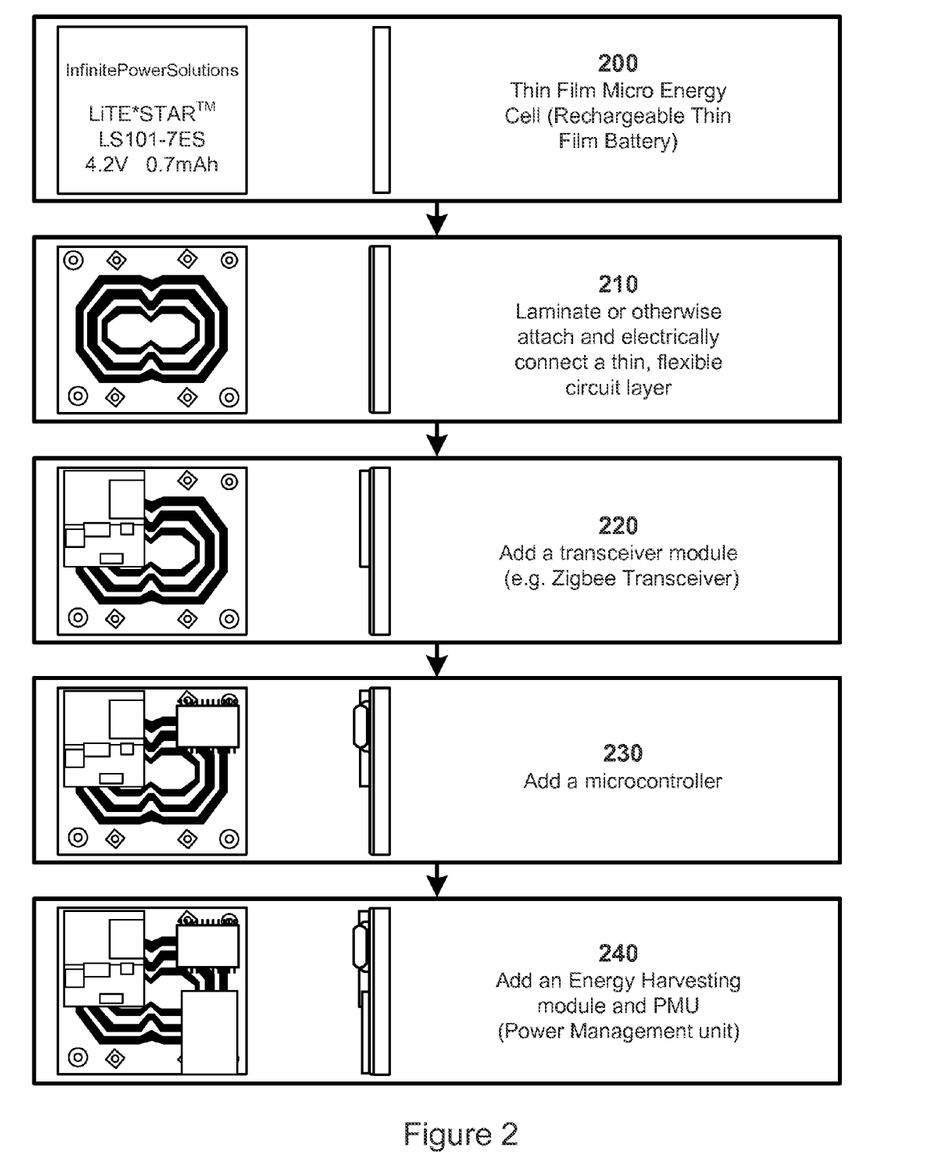
FIG. 2 is a diagram of an embodiment of the present invention showing the step-by-step construction of an embodiment of one contemplated device.

FIG. 2 shows an example of the steps that may be used to construct some embodiments of the present invention on a substrate, such as, for example, a thin, flexible substrate. Step 200 shows the beginning of the construction where an energy storage device, shown in this example as a thin-film battery, as the foundation. Step 210 shows attaching a substrate to the energy storage device. Step 220 may be performed to add a transmitter/receiver mechanism to the substrate. Step 230 may be performed to add a microcontroller onto the substrate and connecting it to the transmitter/receiver mechanism. Step 240 may be performed to add an energy harvesting mechanism and power management unit to the substrate.

In some embodiments, the substrate may be rigid or semi-rigid. In several embodiments, the substrate may be a thin, flexible substrate. The substrate may be embedded internally, laminated, glued or mechanically attached with screws or otherwise for installation onto the surface of a target application.

In several embodiments, the energy harvesting mechanism is based on a piezoelectric transducer. This embodiment may be used by taking applied mechanical stress or pressure and transforming it into electrical energy to recharge or be stored in an energy storage device. In other embodiments, the energy harvesting mechanism is based on a radio frequency energy transducer. In some embodiments, the energy harvesting mechanism may also be a device that can convert solar power, wind power, vibration, pedestrian activity such as walking or jogging, water movement, temperature variations or rotational movements into usable energy such as electricity.

In addition to an electrochemical storage device, such as a battery or thin-film battery, the energy storage component may be an electrical storage device such as a capacitor or thin-film capacitor, but may also be a mechanical energy storage device, such as, for example, a flywheel, micro-flywheel, micro electro-mechanical system (MEMS), or a mechanical spring. In several embodiments, the thin-film battery may contain a metallic lithium anode. In some embodiments, the thin-film battery may not contain a metallic lithium anode but may instead contain a Li-ion anode or a Li-free anode. The energy storage component may also be an electro-mechanical device, such as a piezoelectric element or a magneto-electric element, similar to the invention disclosed in U.S. Pat. No. 7,088,031, entitled "Method and Apparatus for an Ambient Energy Battery or Capacitor Recharge System" which is herein incorporated by reference in its entirety. The energy storage component may also be a thermal energy storage device, such as a thermal mass container, or it could be a chemical energy storage device, such as, for example, a hydrogen generator with hydrogen container or an ozone generator with ozone container. Each one of these devices may be used to store energy based on exemplary elements of the system.

In some embodiments, the system on the substrate contains a receiver that may receive a signal from one or more GPS satellites to determine the geographic location and direction of the device, as well as the speed of the device if the device happens to be in motion.

In some embodiments, one or more sensors may measure any number of different physical qualities. In some embodiments, one sensor may be measuring the weather in which case it may be, for example, a thermometer to measure the temperature, a hydrometer to measure the humidity, an anemometer to measure the velocity or pressure of the wind or a barometer to measure the atmospheric pressure. A barometer in combination with a microprocessor may be able to detect changes in pressure and predict changes in the weather. In several embodiments, one sensor may be used to measure pressure and determine changes in altitude.

In some embodiments where the energy storage device is a thin-film battery, the thin-film battery may have a thickness that does not exceed 1 cm and a lateral area that may be less than 10 square inches. In another embodiment, the lateral area of said thin-film battery may be less than 0.25 square centimeters.

In a different embodiment, the thin-film battery may have a heat and pressure-resilient separation layer for purposes of incorporating the battery cell into the substrate manufacturing process.

In the several embodiments in which the energy storage device is a rechargeable device, such as, for example, a thin-film battery, this will present an opportunity whereby the present invention may be capable of performing nearly indefinitely. The present invention may, for example, allow for energy created through radio frequency, wind power, solar power, vibration, human activity, water movement, temperature variations and rotational movements to be harvested in an energy harvesting mechanism and for that harvested energy to ensure that the rechargeable energy storage device may be so charged.

This invention has been described herein in several embodiments. It is evident that there are many alternatives and variations that can embrace the performance of ceramics enhanced by the present invention in its various embodiments without departing from the intended spirit and scope thereof. The embodiments described above are exemplary only. One skilled in the art may recognize variations from the embodiments specifically described here, which are intended to be within the scope of this disclosure. As such, the invention is limited only by the following claims. Thus is intended that the present invention cover the modifications of this invention provided they come within the scope of the appended claims and their equivalents.

What is claimed is:

1. An apparatus comprising:
   a substrate having a first side surface and a second side surface;
   an energy harvesting module on the second side surface of said substrate;
   an energy storage device on the first side of said substrate opposite to the energy harvesting module on the second side surface of the substrate and connected to said energy-harvesting module through said substrate between the first and second side surfaces; and
   a microprocessor located on the second side of said substrate opposite to the energy storage device on the first side surface of the substrate and connected to said energy storage device through said substrate between the first and second side surfaces,
   wherein said first and second side surfaces oppose each other.

2. The apparatus of claim 1, further comprising a power management unit connected to said energy harvesting module.

3. The apparatus of claim 1, wherein said substrate comprises any device selected from the group of: rigid substrate, semi-rigid substrate and flexible substrate.

4. The apparatus of claim 1, wherein said substrate comprises any material selected from the group of: polyimide, polyester, polyethylene naphthalate, polyetherimide, aramid, and epoxy.

5. The apparatus of claim 1, further comprising at least one sensor connected to said microprocessor.

6. The apparatus of claim 1, further comprising at least one signal transmitter connected to said microprocessor.

7. The apparatus of claim 1, further comprising at least one signal receiver connected to said microprocessor.

8. The apparatus of claim 1, wherein said energy-harvesting module comprises any device selected from the group of: piezoelectric transducer, radio-frequency transducer, solar cell, wind turbine, vibration energy scavenger, water movement-to-electric energy converter, rotational movement-to-electric energy converter, and temperature variation-to-electric energy converter.

9. The apparatus of claim 5, wherein said at least one sensor comprises any device selected from the group of: an altimeter, a pressure gauge, a thermometer, a barometer, a hygrometer, an accelerometer, and an anemometer.

10. The apparatus of claim 1, wherein said energy storage device comprises any device selected from the group of: battery, thin-film battery, capacitor, thin-film capacitor, magneto-electric element, piezoelectric element, thermal mass container, flywheel, micro-flywheel, micro electro-mechanical system (MEMS), mechanical spring, hydrogen generator with hydrogen container, and ozone generator with ozone container.

11. The apparatus of claim 1, further comprising an energy conversion component connected to the energy harvesting module.

12. The apparatus of claim 1, wherein said energy storage device comprises a thin-film battery with a total thickness that does not exceed 1 centimeter.

13. The apparatus of claim 12, wherein the lateral area of said thin-film battery does not exceed 10 square inches.

14. The apparatus of claim 12, wherein the lateral area of said thin-film battery does not exceed 0.25 square centimeters.

15. The apparatus of claim 12, wherein said thin-film battery contains a heat and pressure-resilient separation layer.

16. The apparatus of claim 12, wherein said thin-film battery contains a metallic lithium anode.

17. The apparatus of claim 12, wherein the electroactive element within said thin-film battery comprises lithium.

18. The apparatus of claim 12, wherein said thin-film battery comprises a lithium-ion cell.

19. The apparatus of claim 12, wherein said thin-film battery is a lithium-free battery.

20. The apparatus of claim 7, wherein said signal receiver receives a signal from a GPS satellite.

21. The apparatus of claim 7, wherein said signal receiver comprises a ZigBee transceiver.

22. A method for communicating information comprising:
   converting energy into a useful form on a second side surface of a substrate;
   storing said useful form of energy on a first side surface of the substrate by a connection through said substrate between the first and second side surfaces;
   powering a processing unit on the second side surface of said substrate opposite to the energy storage device on the first side surface of the substrate with said stored energy on said first side surface of said substrate;
   monitoring at least one parameter with at least one sensor on said second side surface of the substrate;

communicating the monitored parameter to said processing unit powered with said stored energy; and processing said monitored parameter into user data, wherein said first and second side surfaces oppose each other.

23. The method of claim 22 further comprising:

receiving GPS signals from one or more GPS satellites; and determining the location of the device from said GPS signals.

24. An apparatus comprising:

an energy storage device;

a substrate having a first side surface positioned on the energy storage device;

an energy harvesting mechanism on a second side surface of said substrate and connected through said substrate between said first and second side surfaces to said energy storage device; and a microprocessor located on said second surface of said substrate opposite to the energy storage device on the first side surface of the substrate and connected through said substrate between said first and second side surfaces to said energy storage device, wherein said first and second side surfaces oppose each other.

* * * * *